(12) United States Patent
Aoyama

(10) Patent No.: US 11,646,639 B2
(45) Date of Patent: May 9, 2023

(54) ELECTRIC POWER TOOL

(71) Applicant: MAKITA CORPORATION, Anjo (JP)

(72) Inventor: Kiyoshi Aoyama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 247 days.

(21) Appl. No.: 16/970,726

(22) PCT Filed: Mar. 1, 2019

(86) PCT No.: PCT/JP2019/008184
§ 371 (c)(1),
(2) Date: Aug. 18, 2020

(87) PCT Pub. No.: WO2019/187991
PCT Pub. Date: Oct. 3, 2019

(65) Prior Publication Data
US 2021/0091640 A1     Mar. 25, 2021

(30) Foreign Application Priority Data
Mar. 30, 2018   (JP) .............................. JP2018-068827

(51) Int. Cl.
*H02K 11/215*      (2016.01)
*H02K 1/276*       (2022.01)
(Continued)

(52) U.S. Cl.
CPC .............. *H02K 11/215* (2016.01); *B25F 5/00* (2013.01); *H02K 1/276* (2013.01); *H02K 7/145* (2013.01); *H02K 21/16* (2013.01); *H02K 2211/03* (2013.01)

(58) Field of Classification Search
CPC ...... H02K 11/215; H02K 1/276; H02K 7/145; H02K 21/16; H02K 2211/03
(Continued)

(56) References Cited

U.S. PATENT DOCUMENTS

| | | | |
|---|---|---|---|
| 9,755,490 B2 | 9/2017 | Inuzuka | |
| 2015/0180307 A1* | 6/2015 | Inuzuka | .................. B25F 5/008 310/50 |

FOREIGN PATENT DOCUMENTS

| | | | |
|---|---|---|---|
| CN | 103872825 A | * | 6/2014 |
| CN | 104753215 A | | 7/2015 |

(Continued)

OTHER PUBLICATIONS

Apr. 16, 2019 International Search Report issued in International Patetn Application No. PCT/JP2019/008184.
(Continued)

*Primary Examiner* — Jose A Gonzalez Quinones
(74) *Attorney, Agent, or Firm* — Oliff PLC

(57) ABSTRACT

A vibration driver drill as an electric power tool includes a brushless motor that includes a rotor and a sensor circuit board that detects a rotation of the rotor. The rotor includes a tubular rotor core and four permanent magnets held in the rotor core so as to extend in an axial direction of the rotor core. The sensor circuit board is adjacent to a front-end part (first end portion) of the rotor core. The rotor core is provided with a recessed groove on a side surface outward between the mutually adjacent permanent magnets. The recessed groove extends from the front-end part in the axial direction of the rotor core without reaching a rear-end part (second end portion) facing the front-end part.

4 Claims, 20 Drawing Sheets

(51) Int. Cl.
*H02K 7/14* (2006.01)
*H02K 21/16* (2006.01)
*B25F 5/00* (2006.01)

(58) Field of Classification Search
USPC .............................................. 310/50, 156.01
See application file for complete search history.

(56) References Cited

FOREIGN PATENT DOCUMENTS

| CN | 107733111 A | * | 2/2018 | ............... H02K 1/22 |
| DE | 102010020502 A1 | * | 4/2011 | ............... H02K 1/30 |
| EP | 2963775 A1 | * | 1/2016 | ........... H02K 1/2773 |
| JP | 09308152 A | * | 11/1997 | |
| JP | H09-308152 A | | 11/1997 | |
| JP | 2009-112121 A | | 5/2009 | |
| JP | 2012016189 A | * | 1/2012 | |
| JP | 2015-123515 A | | 7/2015 | |
| JP | 2016-116267 A | | 6/2016 | |
| JP | 2016-178751 A | | 10/2016 | |
| JP | 2017055560 A | * | 3/2017 | |
| WO | 2014/027631 A1 | | 2/2014 | |
| WO | WO-2017046953 A1 | * | 3/2017 | ........... F04D 29/043 |

OTHER PUBLICATIONS

Oct. 6, 2020 International Preliminary Report on Patentability issued in International Patent Application No. PCT/JP2019/008184.

Nov. 2, 2021 Office Action issued in Japanese Patent Application No. 2018-068827.

May 24, 2022 Office Action issued in Japanese Patent Application No. 2018-068827.

Nov. 9, 2022 Office Action issued in Chinese Patent Application No. 201980019743.4.

* cited by examiner

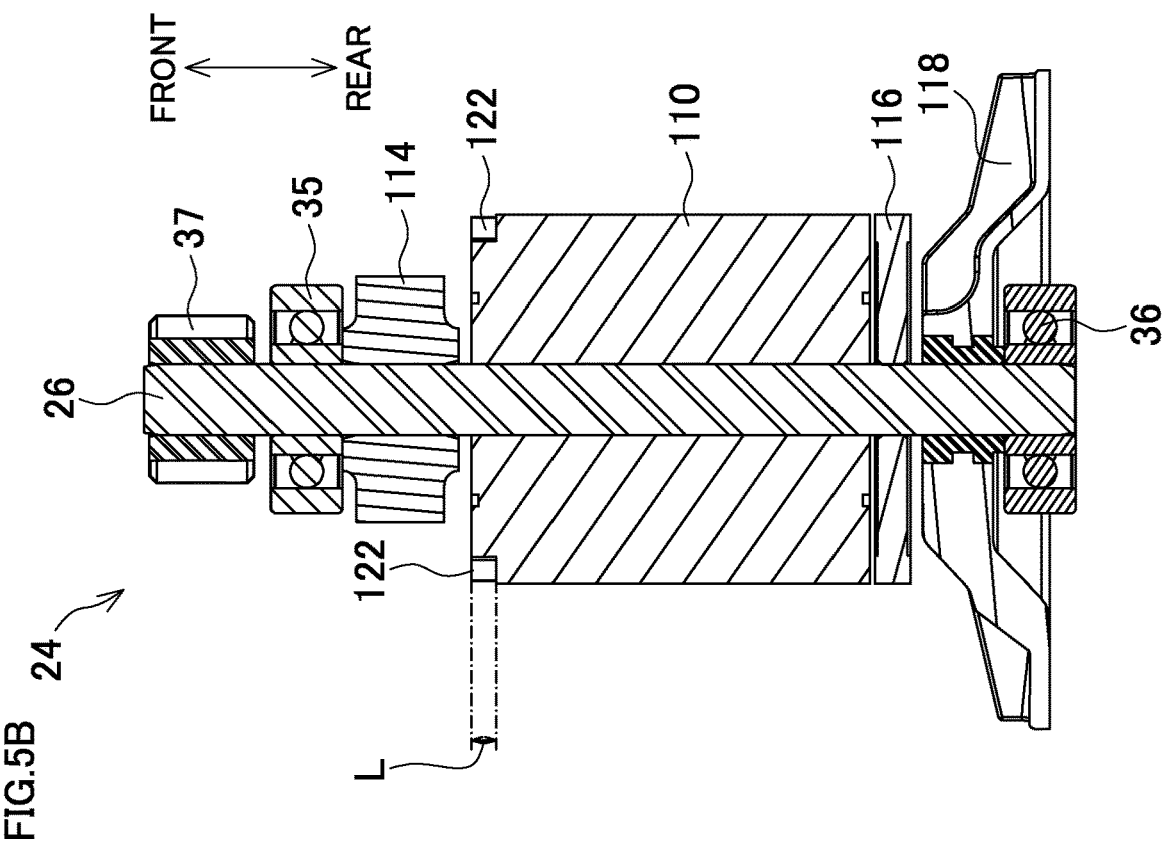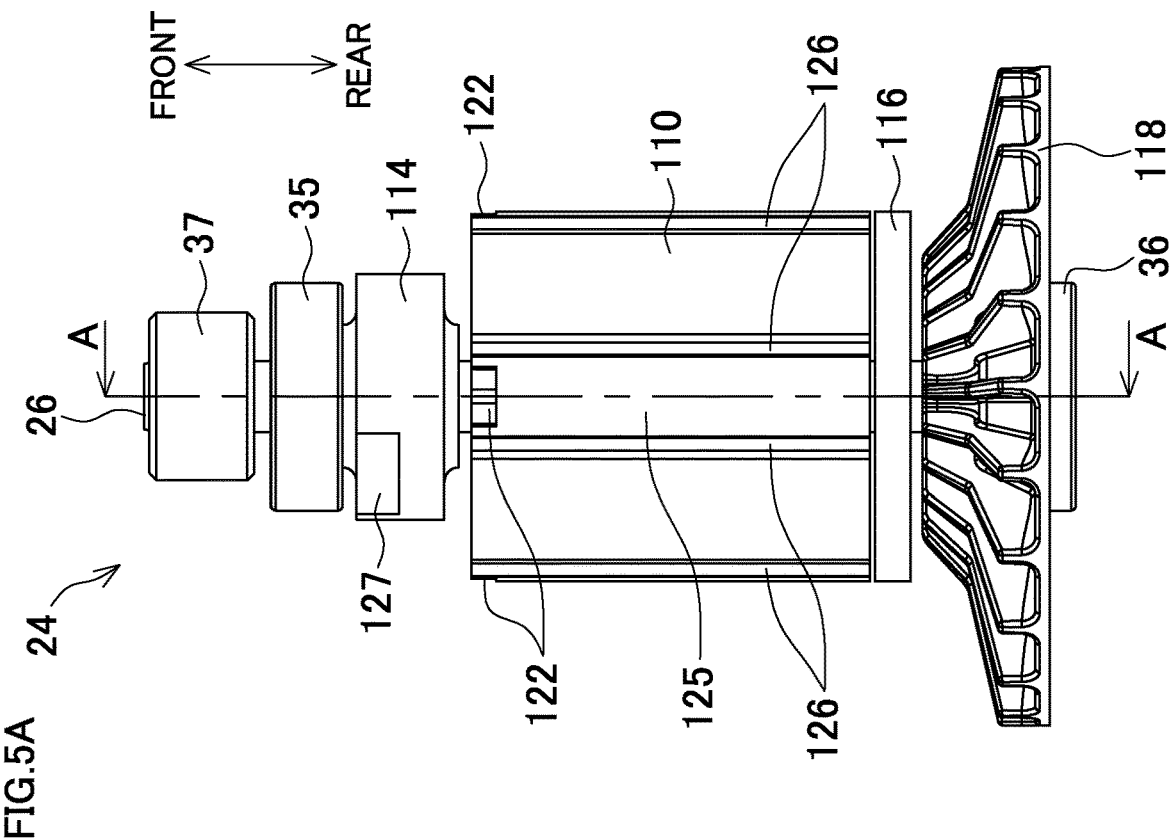

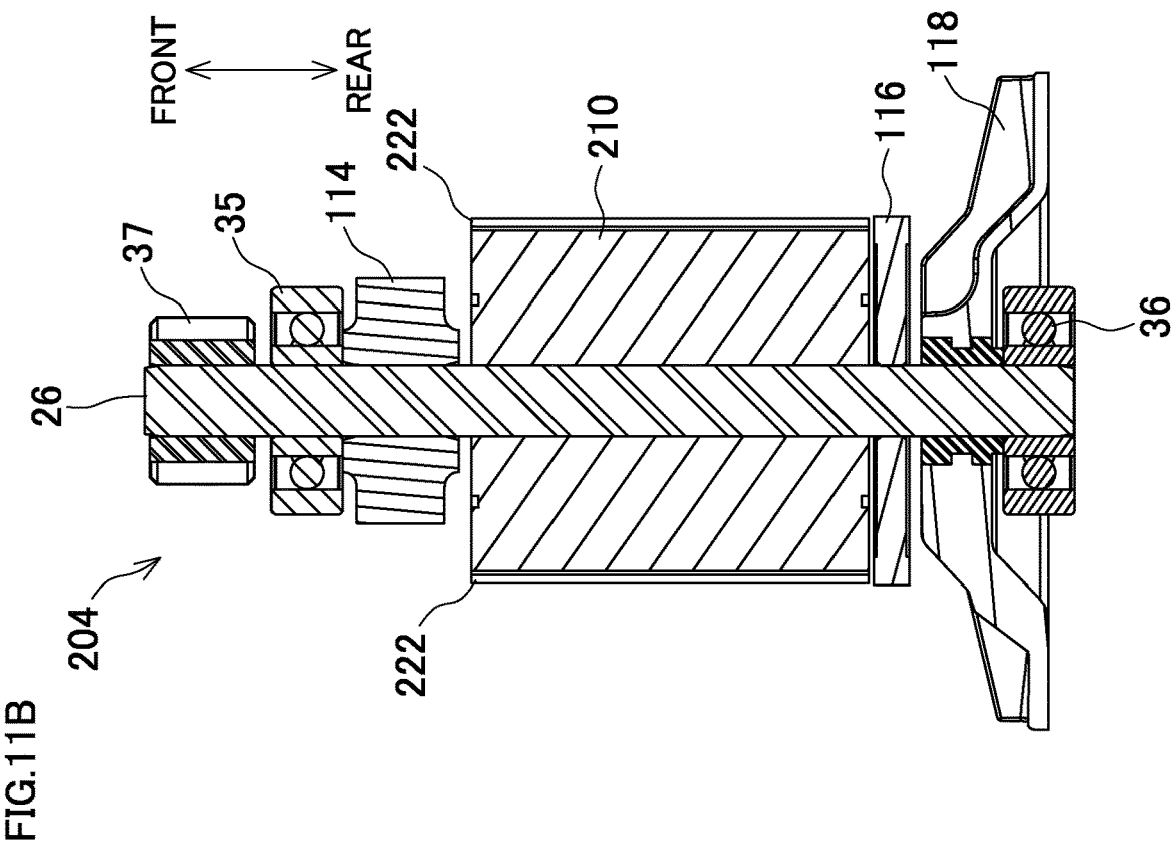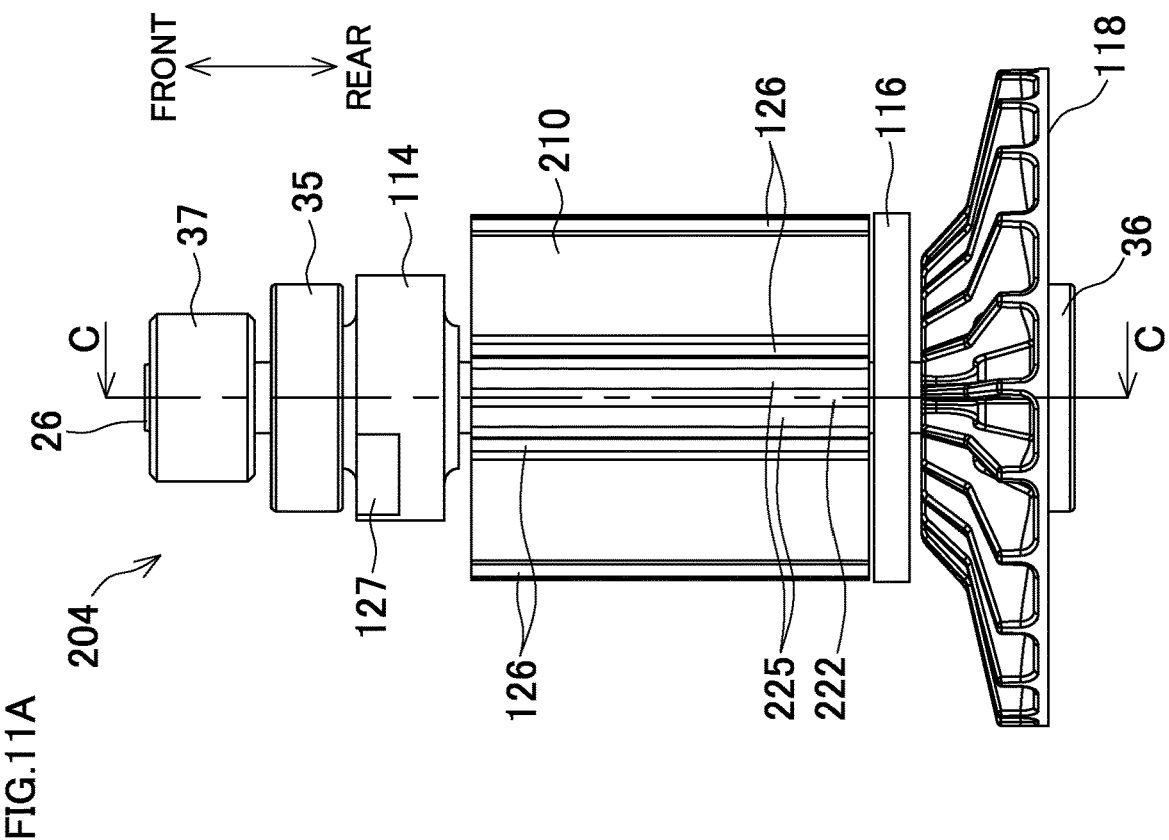

ELECTRIC POWER TOOL

This application claims the benefits of International Application No. PCT/JP2019/008184, filed on Mar. 1, 2019 and Japanese Patent Application Number No. 2018-068827 filed on Mar. 30, 2018, the entirety of which is incorporated by reference.

BACKGROUND OF THE INVENTION

Technical Field

The present invention relates to an electric power tool including a driver drill.

Background Art

As disclosed in Japanese Laid-Open Patent Publication No. 2015-123515 (JP-A-2015-123515), a driver drill that uses a brushless motor has been known.

The brushless motor of the driver drill of JP-A-2015-123515 includes a cylindrical stator and a columnar rotor disposed inside the stator.

The stator includes six coils and a sensor circuit board.

The rotor includes a rotor core in which a plurality of steel plates are laminated, a motor shaft that is inserted through the center of the rotor core and integrated, and four permanent magnets inserted through respective four through-holes axially provided to the rotor core. The four permanent magnets are arranged so as to occupy the center portions of respective four side surfaces of a square pillar, and have the aligned poles in a circumferential direction (rotation direction).

On parts positioned outside both ends of the respective permanent magnets on an outer peripheral surface of the rotor core, chamfered portions, eight in total, are disposed in the purpose of positioning the rotor core during the rotor fabrication (when inserting the permanent magnets into the rotor core) (FIG. 5(A)). Flux barriers are disposed on parts adjacent to the end portions of the respective permanent magnets inside between the chamfered portions across the end portions of the mutually adjacent permanent magnets. The flux barriers reduce pass of a magnetic flux to adjust a direction and the like of the magnetic flux. Alternatively, recessed grooves, four in total, having V-shaped cross sections are provided on parts positioned outside both ends of the respective permanent magnets on the outer peripheral surface of the rotor core. The recessed grooves are provided in the similar purpose (FIG. 5(B)). In the case, since the recessed groove adjusts the flow and the like of the magnetic flux, the flux barrier is not disposed inside the rotor core.

The brushless motor is rotated by a microcomputer as follows. The microcomputer obtains a rotation detection signal that is output from a rotation detecting element of the sensor circuit board and indicates positions of the permanent magnets, thus obtaining a rotating state of the rotor. The microcomputer sequentially flows a current to the coils corresponding to the obtained rotating state, thereby causing magnetic forces of the coils to act to the permanent magnets.

The microcomputer generally obtains the rotating state of the rotor through a switching of the polarity between the N-pole and the S-pole detected by the rotation detecting element before and after a time point at which the end portions of the permanent magnets mutually adjacent in the rotation direction become closest.

SUMMARY OF THE INVENTION

Among the brushless motors of the driver drill described above, in that of FIG. 5(A) in which the chamfered portions are provided to the rotor core, the part between the chamfered portions across the end portions of the mutually adjacent permanent magnets includes the flux barrier and projects radially outward with respect to the other parts. Accordingly, the rotation detecting element detects a polarity reversal R at a time point of the switching of the polarity. The polarity reversal R possibly affects the accuracy of the rotation detection signal. To reduce the influence, it is considered that a distance between the rotation detecting element and the permanent magnet is increased to cause the reversal R to be hardly detected. However, an adequate space is necessary, the entire accuracy of the rotation detection signal is affected, and the detection of the position of the permanent magnet by the rotation detecting element becomes difficult as the magnetic force (electric power of the brushless motor) of the coil is increased for increasing the output.

Meanwhile, in that of FIG. 5(B) in which the recessed grooves are provided to the rotor core, the recessed grooves are depressed radially inward with respect to the other parts. Accordingly, the rotation detecting element does not detect the polarity reversal R at the time point of the switching of the polarity. However, compared with that of FIG. 5(A), the torque of the rotor decreases by the amount of the recessed groove in that of FIG. 5(B), and specifically, the torque of that of FIG. 5(B) is 99.5 when the torque of that of FIG. 5(A) is 100.

A main object of the present invention is to provide an electric power tool in which an accuracy of rotation detection of a rotor in a brushless motor is excellent.

A main object of the present invention is to provide an electric power tool in which a torque of a rotor in a brushless motor is ensured.

A first aspect of the invention is an electric power tool that includes a brushless motor. The brushless motor includes a rotor and a sensor circuit board. The sensor circuit board detects a rotation of the rotor. The rotor includes a tubular or columnar rotor core and a plurality of permanent magnets. The plurality of permanent magnets are held in the rotor core so as to extend in an axial direction of the rotor core. The sensor circuit board is adjacent to a first end portion of the rotor core. The rotor core is provided with a recessed groove on a side surface outward between the mutually adjacent permanent magnets. The recessed groove extends from the first end portion in the axial direction of the rotor core without reaching a second end portion facing the first end portion.

In a second aspect of the invention, in the invention described above, a length of the recessed groove in the axial direction of the rotor core may be 1.0 millimeters or more.

In a third aspect of the invention, in the invention described above, the rotor core may be formed by axially laminating a plurality of steel plates, and the recessed groove may be formed by forming recessed portions recessed radially inward on a part of the steel plates on the first end portion side.

In a fourth aspect of the invention, in the invention described above, the sensor circuit board may have a doughnut shape and may include a rotation detecting element that magnetically detects the rotation of the rotor.

A fifth aspect of the invention is an electric power tool that includes a brushless motor. The brushless motor includes a rotor and a sensor circuit board. The sensor circuit board detects a rotation of the rotor. The rotor includes a tubular or columnar rotor core and a plurality of permanent magnets. The plurality of permanent magnets are held in the rotor core so as to extend in an axial direction of the rotor core. The sensor circuit board is adjacent to a first end portion of the rotor core. The rotor core includes a flux barrier and a groove. The flux barrier has a semicircular cross section and is disposed so as to have a curved surface facing an end portion at the end portion in a circumferential direction of the permanent magnet. The groove extends from the first end portion in the axial direction of the rotor core on a side surface outward between the mutually adjacent permanent magnets.

In a sixth aspect of the invention, in the invention described above, the groove may not reach a second end portion facing the first end portion.

In a seventh aspect of the invention, in the invention described above, a length of the groove in the axial direction of the rotor core may be 1.2 millimeters or more.

In an eighth aspect of the invention, in the invention described above, the rotor core may be formed by axially laminating a plurality of steel plates, and the groove may be formed by forming recessed portions recessed radially inward on a part of the steel plates on the first end portion side.

In a ninth aspect of the invention, in the invention described above, the side surface of the rotor core radially outward the flux barrier may have a semi-cylindrical shape, and may include a part parallel to a surface of the flux barrier facing the permanent magnet.

In a tenth aspect of the invention, in the invention described above, the sensor circuit board may have a dough-nut shape and may include a rotation detecting element that magnetically detects the rotation of the rotor.

An eleventh of the invention includes a motor shaft, a plurality of permanent magnets extending in an axial direction of the motor shaft, a rotor core penetrated by the motor shaft, and a magnetic sensor that detects a rotation of the permanent magnet. The rotor core has shapes different between a portion on the magnetic sensor side and a portion on its opposite side.

A twelfth of the invention includes a motor shaft, a plurality of permanent magnets extending in an axial direction of the motor shaft, a rotor core penetrated by the motor shaft, and a magnetic sensor that detects a rotation of the permanent magnet. An occurrence of polarity reversal at a switching of the polarity is avoided by a shape of the rotor core.

A main effect of the present invention is to provide the electric power tool in which the accuracy of rotation detection of the rotor in the brushless motor is excellent.

A main effect of the present invention is to provide the electric power tool in which the torque of the rotor in the brushless motor is ensured.

BRIEF DESCRIPTION OF THE DRAWINGS

FIG. 5A is a side view of FIG. 4.

FIG. 5B is a cross-sectional view taken along a line A-A of FIG. 5A.

FIG. 11A is a side view of the rotor according to the second embodiment.

FIG. 11B is a cross-sectional view taken along a line C-C of FIG. 11A.

EMBODIMENTS

The following describes embodiments and modification examples of the invention based on the drawings as necessary. Front and rear, up and down, and right and left in the embodiments and the modification examples are defined for convenience of explanation, and they are changed depending on the situation of the work, the state of the moving member, and the like. The invention is not limited to the embodiments and the modification examples below.

A first embodiment of the invention is described below.

Figure 1:
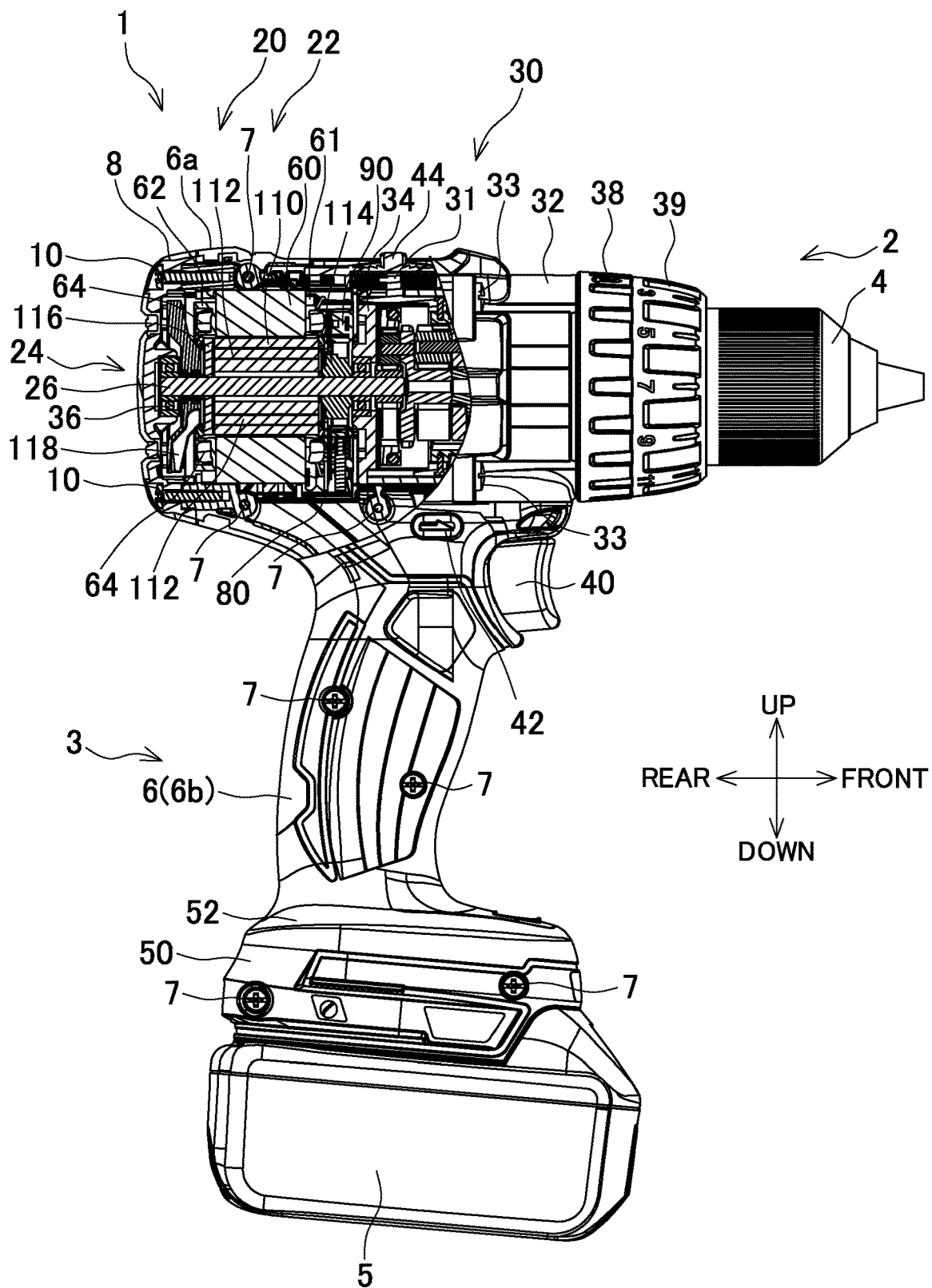
FIG. 1 is a right side view (partial center vertical cross-sectional view) of a vibration driver drill according to a first embodiment of the invention.
Figure 2:
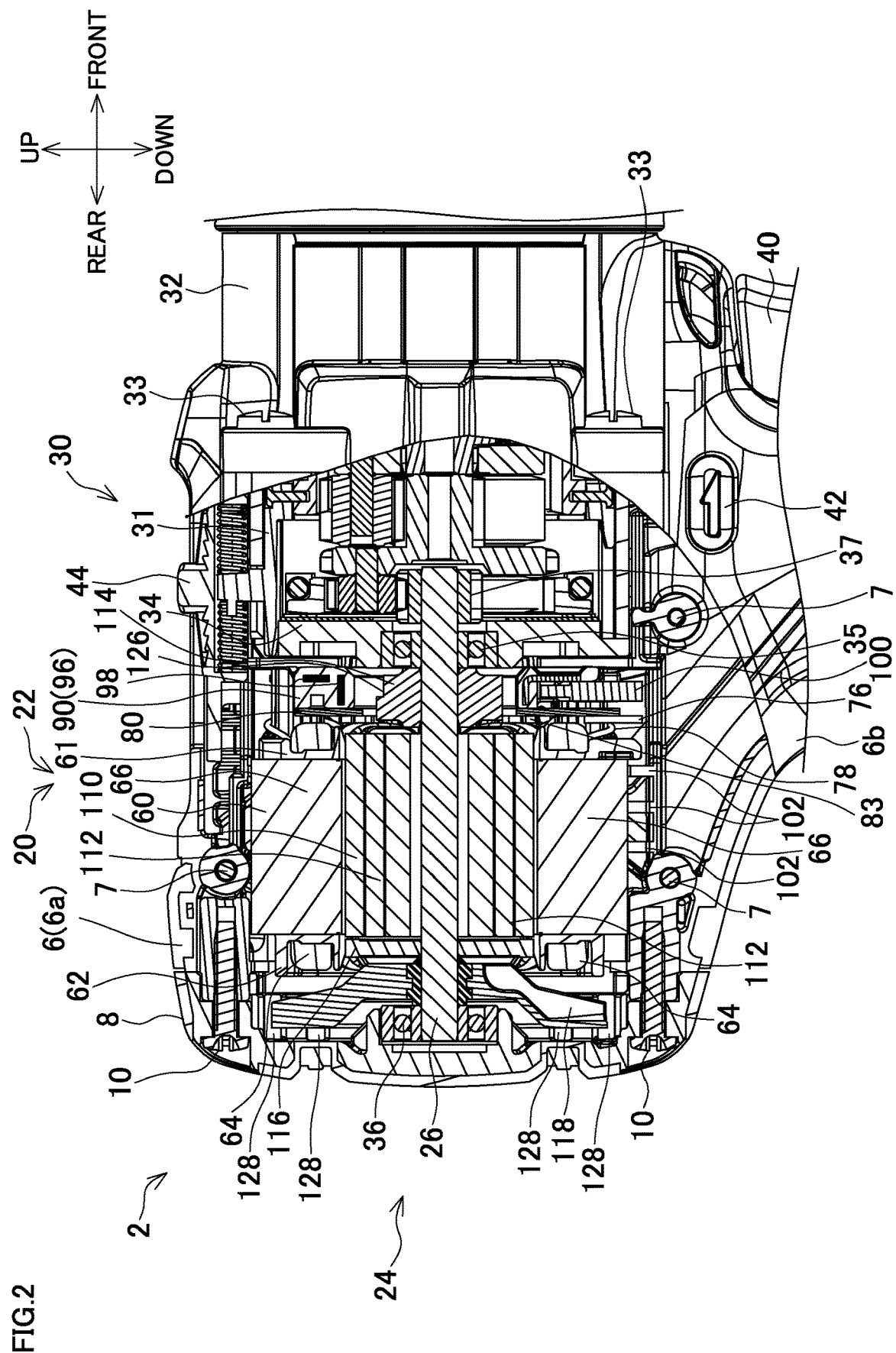
FIG. 2 is a partial enlarged view of FIG. 1.

FIG. 1 is a right side view (partial center vertical cross-sectional view) of a vibration driver drill 1 as an exemplary electric power tool according to the first embodiment of the invention. FIG. 2 is a partial enlarged view of FIG. 1.

The vibration driver drill 1 includes a tubular main body 2 having a center axis in the front-rear direction, and a handle portion 3 formed to project downward from a lower portion of the main body 2.

At the front end of the main body 2, a drill chuck 4 as a tool bit holder, which is configured to hold a bit (tool bit) at a distal end portion, is disposed. In FIG. 1, the right side is the front.

A battery pack 5 as a power source is mounted to the lower end of the handle portion 3.

A motor housing 6, which is an outer wall of the rear half of the main body 2 and the handle portion 3, is formed by assembling halved left motor housing 6a and right motor housing 6b by a plurality of screws 7 in the right-left direction.

To the rear portion of the motor housing 6, a disk-shaped cap housing 8 expanding up-down and right-left directions is assembled by a plurality of (two positions of up and down) screws 10 in the front-rear direction.

Inside the rear portion of the main body 2 in the motor housing 6, a brushless motor 20 is held.

Figure 3:
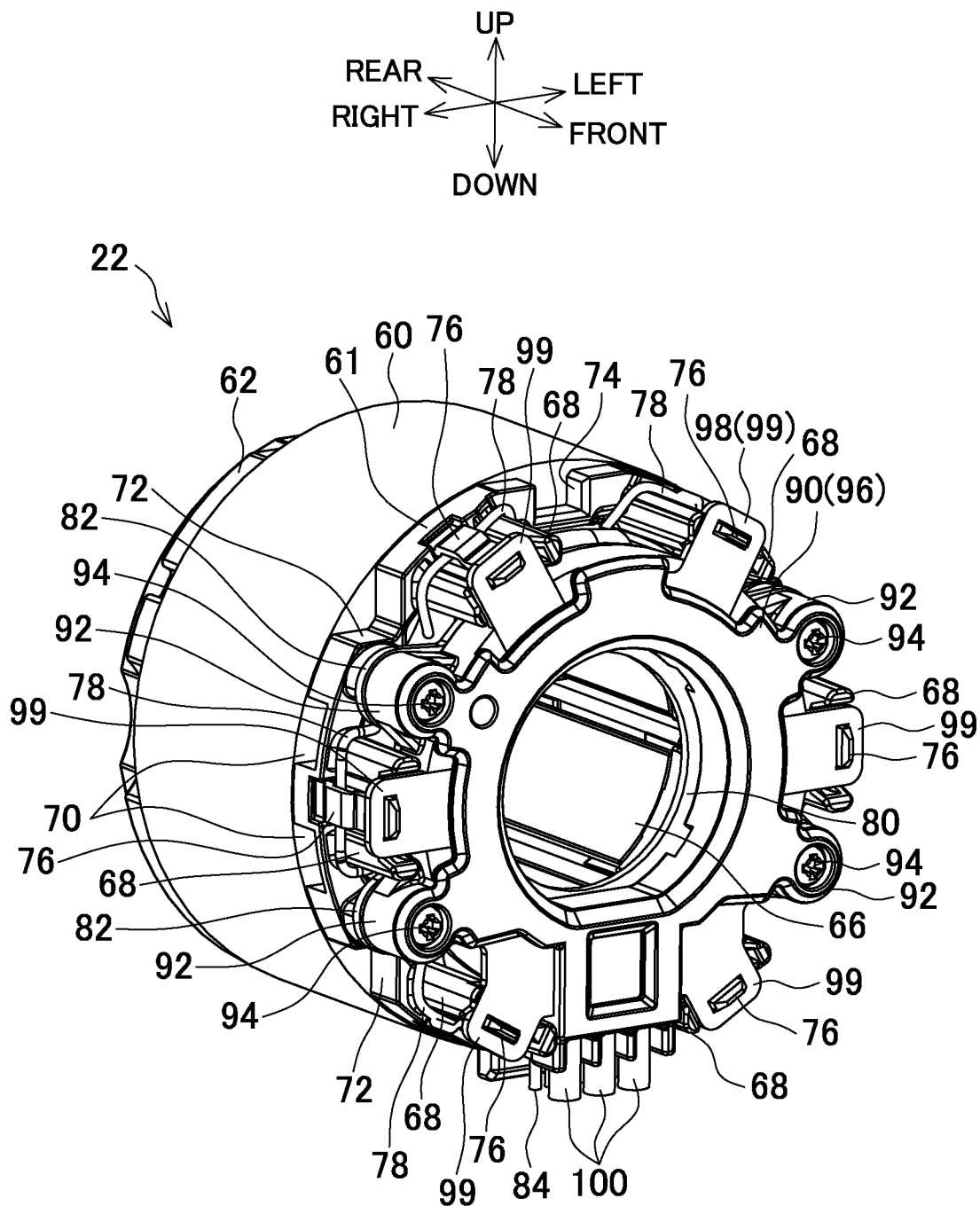
FIG. 3 is a perspective view of a stator of FIG. 1.

The brushless motor 20 includes a tubular stator 22 also illustrated in FIG. 3 and a columnar rotor 24 also illustrated in FIG. 4 to FIG. 6B. The rotor 24 is disposed inside the stator 22, rotatable with respect to the stator 22. This kind of brushless motor is called an inner rotor type brushless motor. The rotor 24 includes a motor shaft 26.

On the front side of the brushless motor 20, a planetary gear mechanism 30, a clutch mechanism (not illustrated), a vibration mechanism (not illustrated), and a spindle (not illustrated) are sequentially disposed. The planetary gear mechanism 30 is held onto the motor housing 6 via a gear case 31. The clutch mechanism, the vibration mechanism, and the spindle are held onto a front housing 32. The front housing 32 is assembled to the upper front portion of the motor housing 6 by a plurality of screws 33 in the front-rear direction.

The planetary gear mechanism 30 decelerates the rotation of the motor shaft 26 of the brushless motor 20 and transmits to the spindle. The drill chuck 4 is mounted to the spindle.

An opening at the rear portion of the gear case 31 is covered with a plate-shaped cap 34 expanding up-down and right-left directions. A front motor bearing 35 that rotatably supports the motor shaft 26 is held onto the center of the cap 34. Meanwhile, a rear motor bearing 36 that rotatably supports the motor shaft 26 is held onto the center of the cap housing 8.

A pinion 37 is mounted to the front-end part of the motor shaft 26. The pinion 37 is engaged with a planetary gear of a first stage of the planetary gear mechanism 30. The pinion 37 may be teeth formed to the distal end portion of the motor shaft 26.

A mode switching ring 38 and a clutch adjustment ring 39 are sequentially disposed from rear to front ahead of the front housing 32. The drill chuck 4 is disposed ahead of the clutch adjustment ring 39.

A trigger 40 is exposed from the upper portion of the handle portion 3 downward the main body 2. The trigger 40 is coupled to a main switch (not illustrated).

A forward/reverse switching button 42 for switching the rotation direction of the motor shaft 26 is disposed above the main switch. Ahead of the forward/reverse switching button 42, an LED (not illustrated) for illuminating forward the drill chuck 4 is housed facing obliquely upward.

A speed switching lever 44 for switching the rotation speed of the drill chuck 4 is disposed at the upper portion of the main body 2 and the upper side of the planetary gear mechanism 30.

A mounting portion 50 is disposed to the lower end of the handle portion 3. The battery pack 5 is slid to be mounted to the mounting portion 50 from the front side.

The mounting portion 50 internally holds a terminal block (not illustrated) and a controller (not illustrated). The terminal block includes a mounting portion side terminal to which the battery pack 5 is electrically coupled. The controller includes a control circuit board and a controller case holding the control circuit board. The control circuit board includes a microcomputer for controlling the brushless motor 20, six switching elements, and the like, and is electrically coupled to the main switch and the stator 22 of the brushless motor 20.

A hook mounting portion 52 (only the right side is illustrated in FIG. 1) for mounting a hanging hook (not illustrated) is disposed to the right and the left of the mounting portion 50.

The battery pack 5 includes a rechargeable battery (not illustrated), a battery side terminal (not illustrated), a battery claw (not illustrated) for retaining, and a button (not illustrated). The rechargeable battery includes ten rechargeable battery cells, and a voltage of 18 V can be applied to the rechargeable battery. The battery side terminal is coupled to the mounting portion side terminal at the mounting. The battery claw is locked to a locked portion of the mounting portion 50 at the mounting. The button is for performing a lock release operation of the battery claw.

The stator 22 of the three-phase brushless motor 20 includes a tubular stator core 60 having the axial direction in the front-rear direction, a front insulator 61 and a rear insulator 62 as electrical insulation members, and a plurality of (six) coils 64.

The stator core 60 is formed by laminating a plurality of ring-shaped steel plates expanding up-down and right-left directions in the front-rear direction. In the stator core 60, on its inner peripheral portion, six teeth 66 projecting inward with respect to other parts of the inner peripheral portion are circumferentially disposed at equal intervals.

The front insulator 61 has a ring-shaped front portion and six projecting portions that each project rearward from the front portion having a semi-cylindrical shape, and the front insulator 61 is assembled to a front end surface of the stator core 60. The projecting portions cover side portions of the corresponding teeth 66.

The rear insulator 62 has a ring shape and is assembled to a rear end surface of the stator core 60.

The respective coils 64 are wound around the corresponding teeth 66 via the front insulator 61 and the rear insulator 62.

On the front surface of the front insulator 61, a plurality (six pairs) of fusing terminal holding portions 68 are circumferentially disposed at equal intervals. The fusing terminal holding portion 68 includes a pair of protrusions that each project forward with respect to other parts and are circumferentially arranged. Grooves extending in the front-rear direction are provided radially inside the pairs of the protrusions of the respective fusing terminal holding portions 68.

Screw bosses (not illustrated) that project forward having cylindrical shapes are provided between the fusing terminal holding portions 68 (four positions excluding up and down).

Furthermore, pairs of upper and lower recesses 70, which are depressed rearward with respect to other parts, are provided to respective portions at the rear of the right and left fusing terminal holding portions 68 on the rear surface of the front insulator 61 (only the pair of recesses 70 on the right side are illustrated in FIG. 3). First depressed portions 72, which are depressed in triangular shapes radially inward with respect to other parts of a side peripheral surface of the front portion of the front insulator 61, are provided on the respective upper and lower sides across the right and left recesses 70 of the front insulator 61 (only the pair of first depressed portions 72 on the right side are illustrated in FIG. 3). In addition, a second depressed portion 74, which is depressed in a square shape radially inward with respect to other parts of the side peripheral surface, is provided in the center of the upper portion of the front portion of the front insulator 61.

Metal fusing terminals 76 are inserted into the respective fusing terminal holding portions 68. The fusing terminals 76 each include a plate-shaped base portion and a crossover wire receiving portion. The base portion has side portions that are inserted into the respective corresponding grooves of the pair of protrusions of the fusing terminal holding portion 68. The crossover wire receiving portion continuously extends radially outward and forward from the rear-end part of an outer surface of the base portion and has a cross section in a "J" shape.

The coils 64 are wound by one conducting wire around the respective teeth 66 in sequence, and a crossover wire 78 is formed between the predetermined coils 64. The crossover wire 78 passes through radially outside the fusing terminal holding portion 68 and inside the crossover wire receiving portion of the fusing terminal 76 disposed between the pair of protrusions. The crossover wire 78 is fused by the fusing terminal 76, thereby being electrically coupled to the fusing terminal 76.

A doughnut-shaped sensor circuit board 80 is mounted inside each of the fusing terminal holding portions 68 on the front surface of the front insulator 61.

The sensor circuit board 80 includes four projecting portions 82 each projecting radially outward in a state where a through hole corresponding to the screw boss of the front portion of the front insulator 61 is provided. The screw bosses are passed through the through holes of the respective projecting portions 82, thereby positioning the sensor circuit board 80 in the front portion of the front insulator 61.

The sensor circuit board 80 includes a plurality of (three) rotation detecting elements 83 (hole ICs) configured to magnetically detect a rotation position of the rotor 24 to output a rotation detection signal. The rotation detecting elements 83 are each electrically coupled to a pair of rotation detection signal lines 84 (only partially illustrated in FIG. 3) extracted from the lower portion of the sensor circuit board 80.

A ring-shaped short-circuit member 90, which has the diameter approximately same as that of the sensor circuit board 80, is mounted to the front side of the sensor circuit board 80.

The short-circuit member 90 includes cylindrical boss portions 92 disposed similarly to the projecting portions 82 of the sensor circuit board 80. The respective boss portions 92 are matched to the front portions of the corresponding screw bosses on the front portion of the front insulator 61, and secured to the front insulator 61 by inserting screws 94 in the front-rear direction. The short-circuit member 90 (each boss portion 92) holds the sensor circuit board 80, or is in contact with or adjacent to the sensor circuit board 80.

The short-circuit member 90 includes a resin short-circuit member main body 96 and three arc-shaped (semicircular-shaped) sheet metal portions 98. Short-circuit pieces 99 projecting radially outward are formed at both ends of each sheet metal portion 98. The respective sheet metal portions 98 are arranged such that the sheet metal portions 98 have the centers of their arcs arranged in the front-rear direction without any mutual contact while the parts other than the short-circuit pieces 99 become inside the short-circuit member main body 96. The short-circuit member 90 is formed by an insert molding in which the short-circuit member main body 96 is molded in a state where the sheet metal portions 98 are each inserted. Power lines 100 for any of U-phase, V-phase, and W-phase (only partially illustrated in FIG. 2 and FIG. 3) are coupled to the respective sheet metal portions 98. All of the three power lines 100 are extracted downward from the lower portion of the short-circuit member 90.

The short-circuit pieces 99 are each provided with a slit through which the corresponding fusing terminal 76 (upper end portion of the base portion) is inserted. The short-circuit pieces 99 are each electrically joined to the corresponding fusing terminal 76 by soldering. Accordingly, the fusing terminals 76 positioned in point symmetry are short-circuited by the respective sheet metal portions 98, and the crossover wires 78 between the mutually adjacent coils 64 are electrically coupled to one another on each of three diagonals. Accordingly, the six coils 64 form a parallel winding delta connection.

At least any of the fusing terminal 76, the sensor circuit board 80, the short-circuit member 90, and the screw 94 may be a component of the stator 22.

The brushless motor 20 (stator 22) is held by a plurality of motor support ribs 102 projecting inward from the inner surface of the motor housing 6.

Protrusions (not illustrated) projecting inward from the inner surface of the motor housing 6 enter the respective recesses 70 (radially inward holes provided by the recesses 70 and the front surface of the stator core 60 on the side surface of the stator 22). Thus, the brushless motor 20 is positioned (not moved) in the front-rear direction (axial direction) and the circumferential direction (direction around the axis).

When the brushless motor 20 is held onto a tubular housing used for a circular saw and the like, the brushless motor 20 can be positioned by forming the ribs inside the tubular housing to enter the first depressed portion 72 and the second depressed portions 74.

Figure 7:
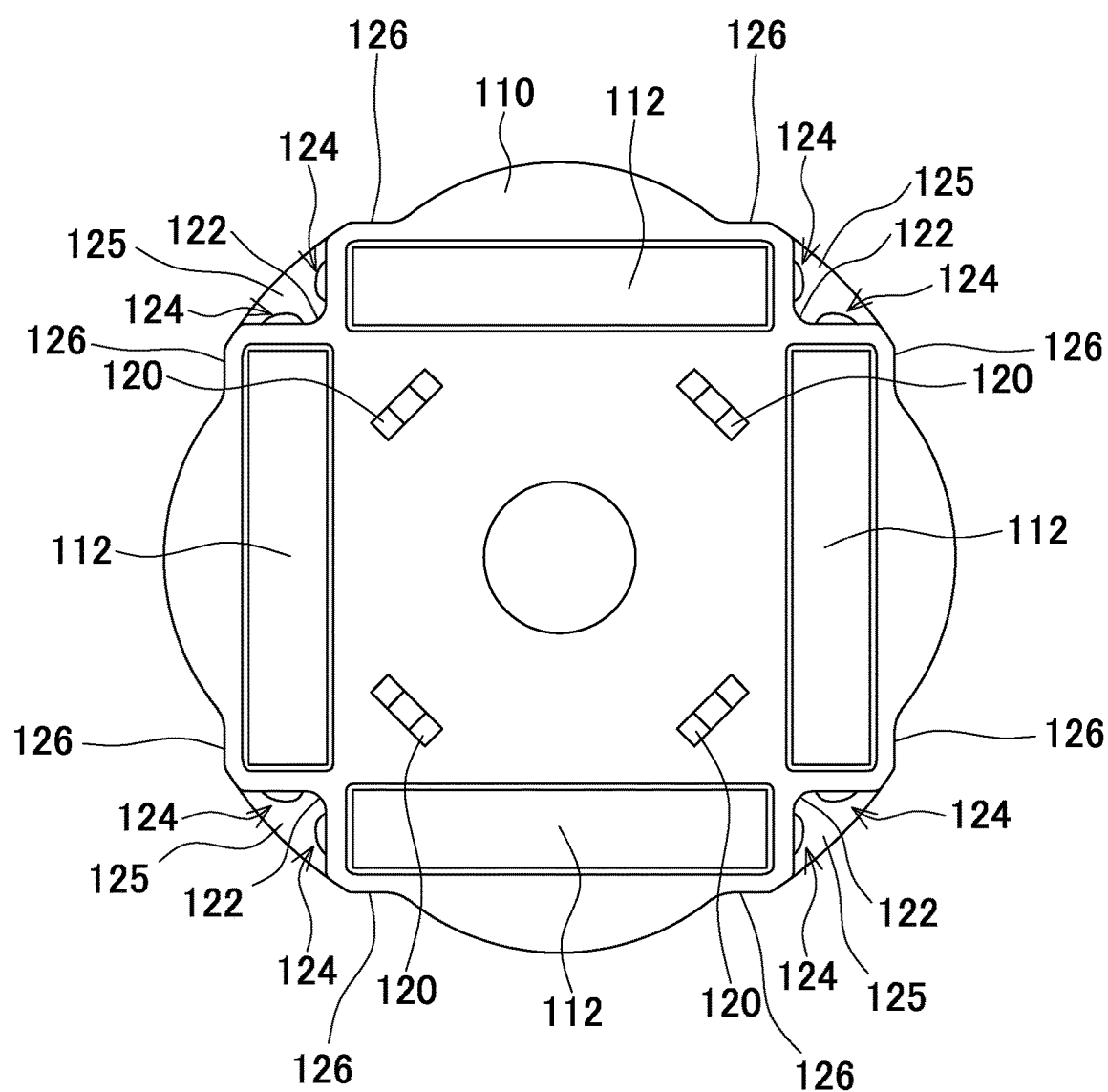
FIG. 7 is a front view of a rotor core of FIG. 4.

The rotor 24 includes the motor shaft 26, the pinion 37, a cylindrical rotor core 110 (refer to FIG. 7), four plate-shaped permanent magnets (sintered magnets) 112 secured inside the rotor core 110, a front stopper 114 and a rear stopper 116 as stopper members for the magnets, and a fan 118. At least any of the front stopper 114, the rear stopper 116, and the fan 118 may be omitted. The fan 118 may be a component different from the rotor 24 (brushless motor 20).

The rotor core 110 is coaxially disposed around the motor shaft 26, and is penetrated by the motor shaft 26. The rotor core 110 is formed by laminating a plurality of (for example, eighty) steel plates. The steel plates each expand up-down and right-left directions and each include caulking portions 120 for coupling to the adjacent steel plates.

The permanent magnets 112 are each inserted into any of through-holes. On a lateral cross-section (a plane expanding up-down and right-left directions) of the rotor core 110, the through-holes are formed to be respectively positioned along four sides of a square whose center is the motor shaft 26. The through-holes are not formed at corner portions of the square. The permanent magnets 112 are secured inside the rotor core 110 using bonding by an adhesive agent and/or press fitting (an IPM method). The permanent magnets 112 each extend in the axial direction of the motor shaft 26.

The front five steel plates among the eighty steel plates of the rotor core 110 have recessed portions (similar to that in FIG. 5(B) of JP-A-2015-123515). The recessed portions are recessed radially inward in triangular shapes. The recessed portions are provided to respective corner portions between the permanent magnets 112. By laminating the five plates, recessed grooves 122 in the front-rear direction are provided to front-end part of the rotor core 110. A length L in the front-rear direction of the recessed groove 122 is 1.0 mm (millimeter).

Flux barriers (voids) 124 having cross sections in half triangular shapes (similar to spaces (54a) in FIG. 5(A) of JP-A-2015-123515) narrowed outward in the radial direction of the rotor core 110 are provided to both end portions of the respective permanent magnets 112 on the remaining seventy-five steel plates relative to the rotor core 110. The flux barriers 124 are each provided from the corner portion radially outward the permanent magnet 112 to a position inside by approximately two thirds of the thickness of the permanent magnet 112. The outside of a pair of mutually adjacent flux barriers 124 (outward between the permanent magnets 112 mutually adjacent in the rotation direction) of the rotor core 110 is a bulge portion 125 bulged radially outward with respect to the other parts of the side surface of the rotor core 110. The bulge portions 125 each have arc-shaped outer shape. The front end of each bulge portion 125 is the rear end of the recessed groove 122, and the recessed groove 122 is provided to only the front-end part of the rotor core 110. Alternatively, the recessed groove 122 may be considered to be formed to the front-end part of each bulge portion 125. In other words, the recessed groove 122 is provided from the front-end part adjacent to the sensor circuit board 80 without reaching the rear-end part of the rotor core 110.

Since the recessed portions (recessed grooves 122) are formed in the front five steel plates of the rotor core 110, the flux barriers 124 are not formed at both end portions of the respective permanent magnets 112, and the steel plates are mutually in contact with both end portions of the respective permanent magnets 112 (via an adhesive agent as necessary). The parts outside both end portions of the respective permanent magnets 112 on the front five steel plates have widths (distance between the inner wall surface of the recessed groove 122 and the permanent magnet 112) of 0.7 mm or more and 0.8 mm or less.

Meanwhile, the parts radially outside both end portions of the respective permanent magnets 112 on the rear seventy-five steel plates relative to the rotor core 110 have widths (width of the steel plate part on the radially outside of the flux barrier 124) of 0.6 mm.

Accordingly, the size (0.7 mm) of the part between the mutually adjacent permanent magnets 112 on the front five steel plates relative to the rotor core 110 is greater than the size (0.6 mm) of the part between the mutually adjacent permanent magnets 112 on the rear seventy-five steel plates relative to the rotor core 110. That is, the wall thickness (0.7 mm) of the recessed groove 122 of the rotor core 110 is greater than the wall thickness (0.6 mm) of the flux barrier 124 at the rear of the recessed groove 122.

Furthermore, outer shapes on both circumferentially outsides of the respective recessed portions on the front five steel plates and outer shapes on both outsides of the four pairs of mutually adjacent flux barriers 124 on the rear seventy-five steel plates include linear parts parallel to the outer surface of the permanent magnet 112. The linear parts are continuous from front to rear to be parallel to the outer surface of the permanent magnet 112, thus forming chamfered portions 126 extending over the entire rotor core 110 in the front-rear direction. The chamfered portions 126 are disposed on both sides in the circumferential direction of the respective bulge portions 125 and the respective recessed grooves 122.

The various configurations of the rotor core 110 is variously changeable, and at least any of the number of laminations of various steel plates, the length L of the recessed groove 122, the wall thickness of the recessed groove 122, the number of the recessed grooves 122, the arrangement of the recessed groove 122, the wall thickness of the flux barrier 124, the length in the front-rear direction of the chamfered portion 126, and the width of the chamfered portion 126 may be increased, decreased, or changed from the above-described configurations.

Hereinafter, a rotor core not according to the first embodiment of the present invention formed by laminating eighty steel plates equivalent to the rear seventy-five steel plates in the rotor core 110 is defined as a comparative example 1. A rotor core not according to the present invention formed by laminating eighty steel plates (note that the wall thickness of the recessed groove 122 is 0.6 mm) equivalent to the front five steel plates in the rotor core 110 is defined as a comparative example 2.

The front stopper 114 is a metal (brass) member in a cylindrical shape, coaxially secured to the motor shaft 26 in a state of having a clearance with the rotor core 110, and disposed between the rotor core 110 and the front motor bearing 35. The outer diameter of the front stopper 114 is smaller than the outer diameter of the rotor core 110. The outer diameter of the front stopper 114 is larger than the diameter of a circle inscribed to each of the permanent magnets 112, thus positioning the front stopper 114 forward the permanent magnets 112. The front stopper 114 has a stepped shape in which the outer diameter of the front-end part is smaller than the outer diameter of the center portion, and the front-end part abuts on only an inner race of the front motor bearing 35, thus avoiding an interference with an outer race.

The rear stopper 116 is a metal (brass) member in a disk shape having the outer diameter same as that of the rotor core 110, coaxially secured to the motor shaft 26, and disposed between the rotor core 110 and the fan 118. The rotor core 110 is secured at the front side of the rear stopper 116.

A cutout 127 for adjusting a balance is provided to the outer periphery of the front stopper 114. The cutout 127 may be provided to the rear stopper 116 instead of the front stopper 114, or to both of the front stopper 114 and the rear stopper 116. When the balance is right, at least one of the cutout 127 of the front stopper 114 and the cutout 127 of the rear stopper 116 may be omitted.

The fan 118 is a centrifugal fan that includes a plurality of fins, coaxially secured to the motor shaft 26, and disposed between the rear motor bearing 36 and the rear stopper 116.

An exhaust outlet 128 is provided to the side surface of the cap housing 8 radially outward the fan 118, and an air inlet (not illustrated) is provided to the side surface of the motor housing 6 radially outward the stator 22.

The front stopper 114 is positioned radially inward the sensor circuit board 80. The front surface of the rotor core 110 is contactlessly adjacent to the rear surface of the sensor circuit board 80.

The rotation detecting elements 83 (magnetic sensor) of the sensor circuit board 80 each detect the positions of the permanent magnets 112 disposed in the rotor 24. The rotation detecting elements 83 are disposed on the rear surface of the sensor circuit board 80 at predetermined intervals in the circumferential direction, and disposed up, upper left, and lower left here.

The respective rotation detecting elements 83 are arranged such that they can be adjacent to respective recessed grooves 122 of the rotor core 110. In other words, the respective rotation detecting elements 83 and the respective recessed grooves 122 are arranged such that a radial distance from a rotation axis (center axis in the front-rear direction of the motor shaft 26) to the rotation detecting elements 83 is similar to a radial distance from the rotation axis to the recessed grooves 122. The rotor core 110 has different shapes between the front portion and the rear portion. The front portion is a portion on the rotation detecting elements 83 side and the recessed grooves 122 are each disposed in the front portion. The rear portion is a portion on the opposite side and the recessed grooves 122 are not disposed in the rear portion.

A temperature detecting element may be mounted to the sensor circuit board 80 to transmit the temperature detection signal to the controller, thereby stopping the driving of the brushless motor 20 when the controller obtains the detection of a temperature of a predetermined temperature or more through a monitoring of the signal. In the case, the temperature rise of the brushless motor 20 can be suppressed, and especially, since the temperature of the vibration driver drill 1 of 18 V relatively easily rises, the temperature rise can be effectively suppressed.

The rotation detecting elements 83 each detect a magnetic-flux density of its own adjacent part (rear side), and the controller obtains the rotation position of the rotor 24 through the switching of the polarity that occurs when the part (recessed groove 122) between the mutually adjacent permanent magnets 112 passes through the front sides of the respective rotation detecting elements 83.

Figure 8A:
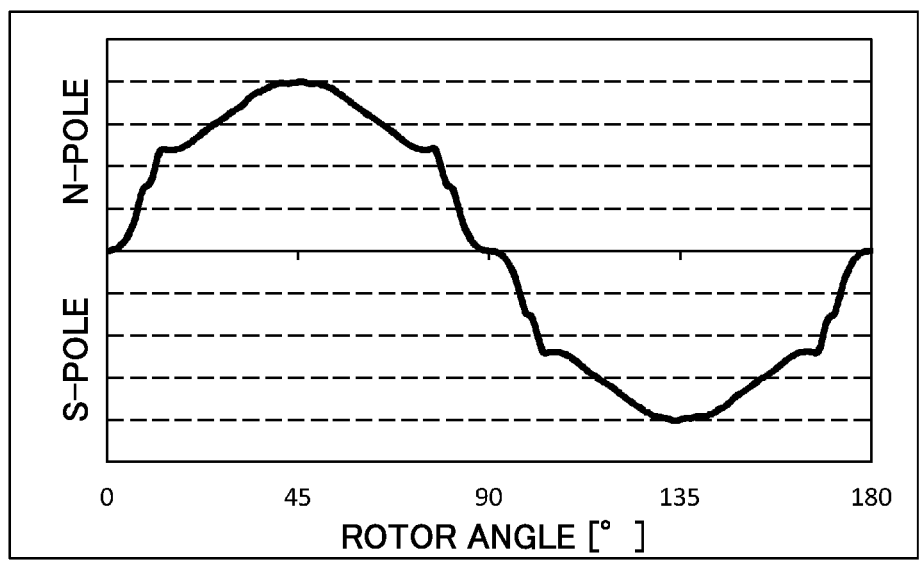
FIG. 8A is a graph indicating a magnetic-flux density detected by one rotation detecting element during a half rotation of the rotor in the invention.

FIG. 8A is a graph indicating the magnetic-flux density (having the N-pole to be positive and the S-pole to be negative) detected by one rotation detecting element 83 during a half rotation of the rotor 24. The vertical axis of the graph indicates the magnetic-flux density (unit T (tesla)), and the horizontal axis indicates the rotation angle (rotor angle, unit °) of the rotor 24 having 0° when the magnetic-flux density is 0. For the magnetic-flux density detected by the rotation detecting element 83 of the vibration driver drill 1, a polarity reversal R does not occur before and after the time of the switching of the polarity (part where the magnetic-flux density is 0 in the graph center).

Figure 8B:
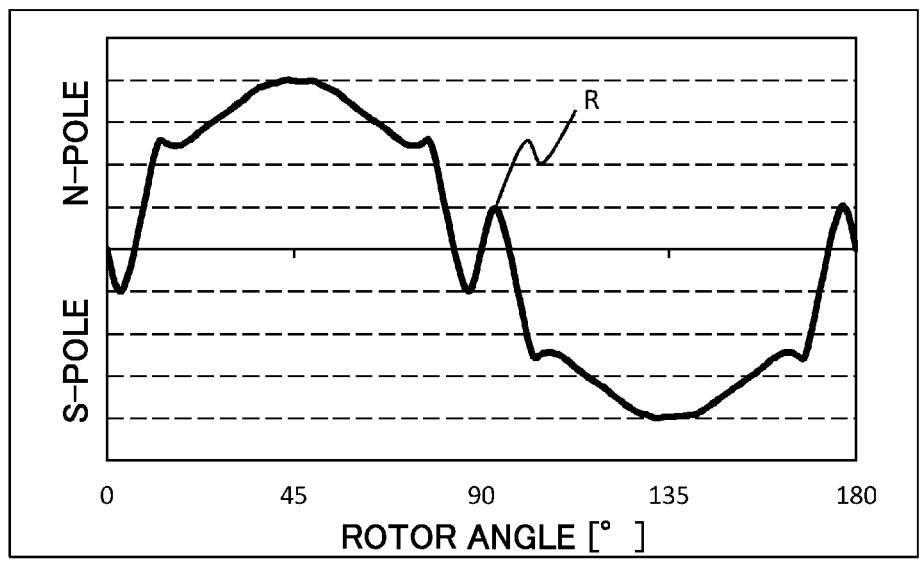
FIG. 8B is a graph indicating a magnetic-flux density detected by one rotation detecting element during a half rotation of a rotor in a comparative example 1.

FIG. 8B is a graph similar to that of FIG. 8A in the above-described comparative example 1 (type in which the flux barrier is contained in the entire front-rear direction). In the comparative example 1, the polarity reversal R in which the pole once returns in the opposite direction occurs at the switching of the polarity.

In the comparative example 2, a transition of the detected magnetic-flux density is similar to that of the present invention, and the polarity reversal R does not occur at the switching of the polarity in the transition. However, the torque of the rotor in the comparative example 2 decreases to 99.5 when the torque of the rotor in the comparative example 1 is 100. In contrast, the torque of the rotor 24 according to the first embodiment of the present invention is 99.9, and maintained to the same extent as the comparative example 1.

An exemplary operation of the vibration driver drill 1 is as follows.

When the user pulls the trigger 40 to turn the main switch ON, the microcomputer of the controller obtains the rotation detection signal output from the rotation detecting element 83 of the sensor circuit board 80 to indicate the position of the permanent magnet 112 of the rotor 24, thereby obtaining the rotating state of the rotor 24. Then, the microcomputer controls ON and OFF of each switching element corresponding to the obtained rotating state, and sequentially flows an exciting current to the coils 64 of the respective phases of the stator 22, thus rotating the rotor 24.

While the rotation detection signal is obtained based on the switching of the polarity, since the reversal R does not occur at the switching of the polarity, the rotation detection signal is obtained with more accuracy. Accordingly, the switching of the coil 64 or the rotation of the rotor 24 is accurately performed, and the brushless motor 20 is driven more accurately.

Figure 9A:
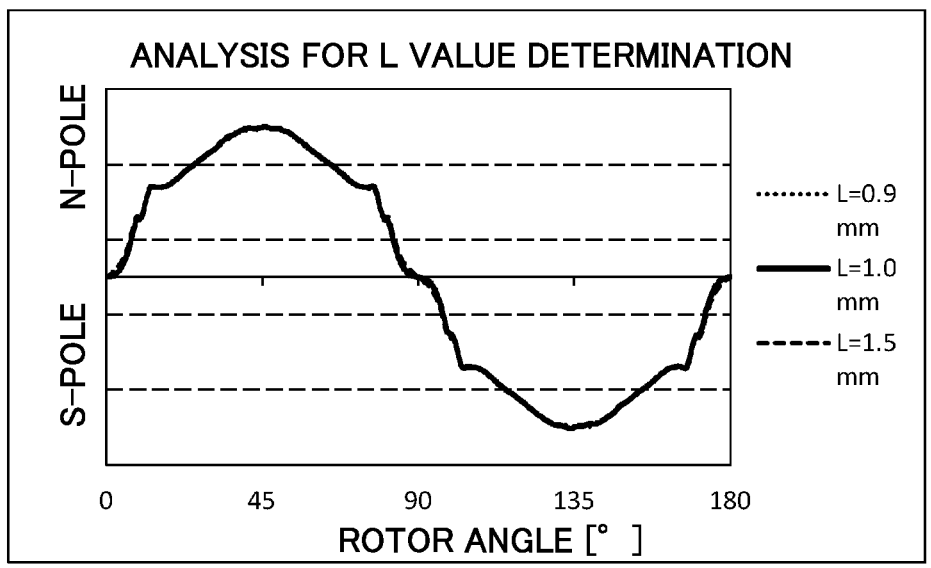
FIG. 9A is a graph indicating a magnetic-flux density detected by one rotation detecting element during a half rotation of the rotor according to three cases of a length L in a front-rear direction of a recessed groove=0.9 mm, 1.0 mm, and 1.5 mm.
Figure 9B:
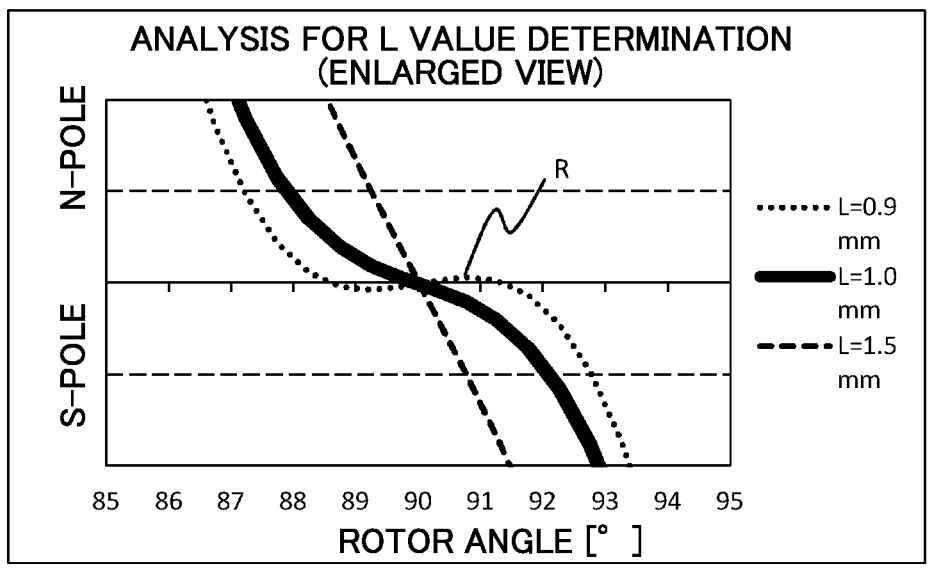
FIG. 9B is a partial enlarged view of FIG. 9A.

FIG. 9A is a graph similar to that of FIG. 8A according to three cases of the length L in the front-rear direction of the recessed groove 122=0.9 mm, 1.0 mm, and 1.5 mm. FIG. 9B is a partial enlarged view of FIG. 9A.

In the case of L=0.9 mm, the reversal R is slightly recognized at the switching of the polarity. In the cases of L=1.0 mm and 1.5 mm, the reversal R is not recognized at the switching of the polarity. In the case of L=1.5 mm, the switching of the polarity is rapid compared with the other cases.

Accordingly, in the case of the length L in the front-rear direction of the recessed groove 122=1.0 mm or more, the sufficiently accurate driving of the brushless motor 20 is ensured.

Meanwhile, as the length L in the front-rear direction of the recessed groove 122 is shortened, decrease of the torque of the rotor 24 relative to the torque of the rotor without the recessed groove 122 is more suppressed.

Under the control, the brushless motor 20 is driven to rotate the motor shaft 26, the spindle and the drill chuck 4 are rotated via the planetary gear mechanism 30 according to the selected operation mode, and the bit mounted to the drill chuck 4 to be rotated is applied to a workpiece.

For the operation mode, by operating the mode switching ring 38, a driver mode in which the clutch mechanism to cutoff the rotation transmission functions at a set torque, a drill mode in which the clutch mechanism does not function, and a vibration mode in which the spindle vibrates back and forth are selectable. By operating the clutch adjustment ring 39, the torque at which the clutch mechanism operates in the driver mode can be set.

When the fan 118 rotates in accordance with the rotation of the motor shaft 26, an air is discharged from the exhaust outlet 128, and a wind from the air inlet on the side surface of the motor housing 6 to the exhaust outlet 128 passing through the outside and the inside (space from the rotor 24) of the stator 22 is generated, thus cooling the brushless motor 20.

Furthermore, since the rotor 24 includes the front stopper 114 and the rear stopper 116 in the front and the rear, the movements of the respective permanent magnets 112 in the front-rear direction are restricted, thus avoiding drop off from the rotor core 110 to provide high reliability of the brushless motor 20.

The vibration driver drill 1 according to the first embodiment described above includes the brushless motor 20 having the rotor 24 and the sensor circuit board 80 that detects the rotation of the rotor 24. The rotor 24 includes the tubular rotor core 110 and the four permanent magnets 112 held in the rotor core 110 so as to extend in the axial direction of the rotor core 110. The sensor circuit board 80 is adjacent to the front-end part (first end portion) of the rotor core 110. The rotor core 110 is provided with the recessed groove 122 on the side surface outward between the mutually adjacent permanent magnets 112. The recessed groove 122 extends from the front-end part in the axial direction of the rotor core 110 without reaching the rear-end part (second end portion) facing the front-end part. Accordingly, the detection accuracy of the rotation of the rotor core 110 by the sensor circuit board 80 is improved, thus accurately driving the brushless motor 20, sufficiently ensuring the torque of the rotor core 110, thereby providing the vibration driver drill 1 in which the operation is accurate and the output is increased.

The length L of the recessed groove 122 in the axial direction of the rotor core 110 is 1.0 millimeters or more. Accordingly, the detection accuracy of the rotation of the rotor core 110 becomes sufficiently excellent.

Furthermore, the vibration driver drill 1 includes the motor shaft 26, the plurality of permanent magnets 112 extending in the axial direction of the motor shaft 26, the rotor core 110 penetrated by the motor shaft 26, and the rotation detecting element 83 that detects the rotations of the permanent magnets 112. The rotor core 110 has the shape different between the portion on the rotation detecting element 83 side (front portion) and the portion on the opposite side (rear portion). Accordingly, the detection accuracy of the rotation of the rotor core 110 by the sensor circuit board 80 is improved, thus accurately driving the brushless motor 20, sufficiently ensuring the torque of the rotor core 110, thereby providing the vibration driver drill 1 in which the operation is accurate and the output is increased.

The vibration driver drill 1 includes the motor shaft 26, the plurality of permanent magnets 112 extending in the axial direction of the motor shaft 26, the rotor core 110 penetrated by the motor shaft 26, and the rotation detecting element 83 that detects the rotations of the permanent magnets 112. The shape of the rotor core 110 is configured to avoid the occurrence of polarity reversal at the switching of the polarity. Accordingly, the detection accuracy of the rotation of the rotor core 110 by the sensor circuit board 80 is improved, thus accurately driving the brushless motor 20, sufficiently ensuring the torque of the rotor core 110, thereby providing the vibration driver drill 1 in which the operation is accurate and the output is increased.

The embodiment of the present invention is not limited the above-described first embodiment, and for example, the following changes may be added to the above-described embodiment as necessary.

For the brushless motor 20, the rotor core 110 may have a cornered cylinder shape, a columnar shape, or a prismatic shape. The coil 64 may be formed by a plurality of wires. The coils 64 may be Y-connected for each phase. At least one of the number of the poles and the number of teeth may be increased or decreased. The rotor 24 may be formed by an SPM method in which the permanent magnets 112 are disposed on the surface instead of the IPM method in which the permanent magnets 112 are embedded. The permanent magnet 112 of the rotor 24 may be curved along the rotation direction instead of the flat plate shape. The power line 100 may be coupled to the stator 22 (coil 64) via the sensor circuit board 80. The screws 94 for mounting the sensor circuit board 80 may include at least one of a press-fit pin and a claw pin. The arrangement of the rotation detecting element 83 on the sensor circuit board 80 may be variously changed including the arrangement over the entire circumference. The rotation detection signal line 84 may be extended in the axial direction of the stator 22. The sensor circuit board 80 may include a switching element that forms an inverter circuit. In the case, the switching element may be disposed at a position overlapping the rotation detecting element 83 in the axial direction, or may be disposed at a position not overlapping in the axial direction. The sensor circuit board 80 may be disposed at the rear of the stator core 60.

The rotor core 110 may have the shape different between the portion on the rotation detecting element 83 side and the portion on the opposite side in an aspect other than with/without the installation of the recessed groove 122. Furthermore, a configuration in which the polarity reversal at the switching of the polarity is avoided by a rotor core having a shape other than the shape of the above-described rotor core 110 may be employed.

The fan 118 may be disposed ahead of the stator 22. For the battery pack 5, any lithium-ion battery of 10.8 to 36 V, such as 10.8 V, 14.4 V, 18 V (20 V at maximum), 25.2 V, 28 V, 36 V, can be used, a lithium-ion battery having a voltage less than 10.8 V or exceeding 36 V can be used, or another kind of battery can be used.

At least any of the number of sections of the housing, the number of installations and the number of stages of the planetary gear, the number of stages of a deceleration mechanism, the number of balls, the number of rollers, the number of various projecting bodies, the number of projecting pieces, the number of screws, the number of various sensors, and the number of various signal lines and power lines may be increased or decreased.

The number, the format, the material, the arrangement, the size, and the like of various members may be changed as necessary, for example, the switching type of the main switch may be changed from the trigger 40 to a button or a lever, or the permanent magnet 112 may be changed to a coil (electromagnet).

The present invention is applicable to an angle power tool in which a direction of an output shaft (tool bit holder) is different (becomes approximately 90 degrees) from a direction of a power unit (axial direction of a motor or a transmission direction of a mechanism that transmits a rotation force of the motor). Furthermore, the present invention may be applied to other electric power tools, such as a driver drill that is not rechargeable (battery powered) including one driven by a commercial power supply, a driver drill without vibration, an impact driver, a grinder, a circular saw, a hammer, and a hammer drill, gardening tools including a cleaner, a blower, or a gardening trimmer, and the like.

A second embodiment of the invention is described below.

Figure 4:
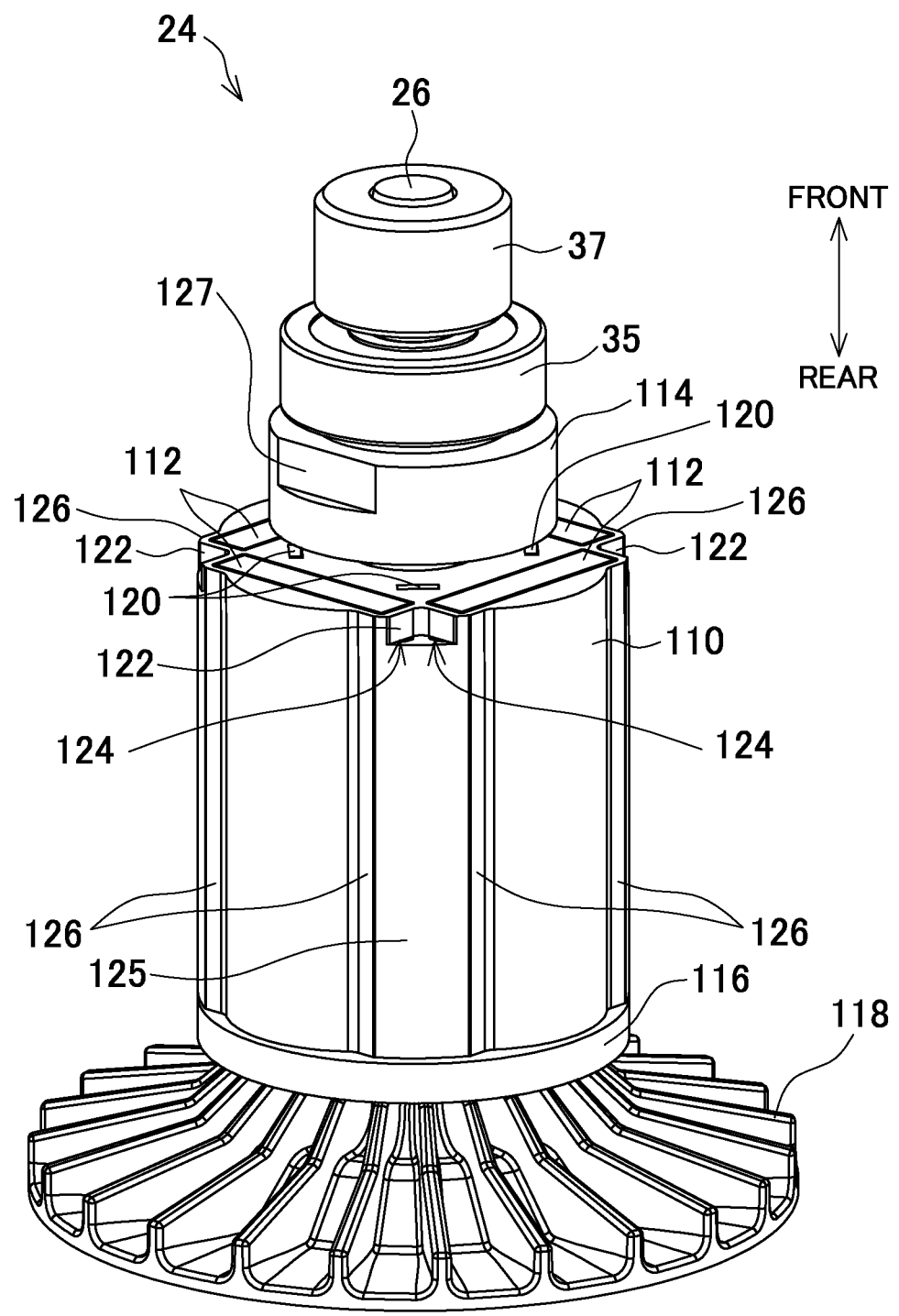
FIG. 4 is a perspective view of a rotor of FIG. 1.
Figure 6A:
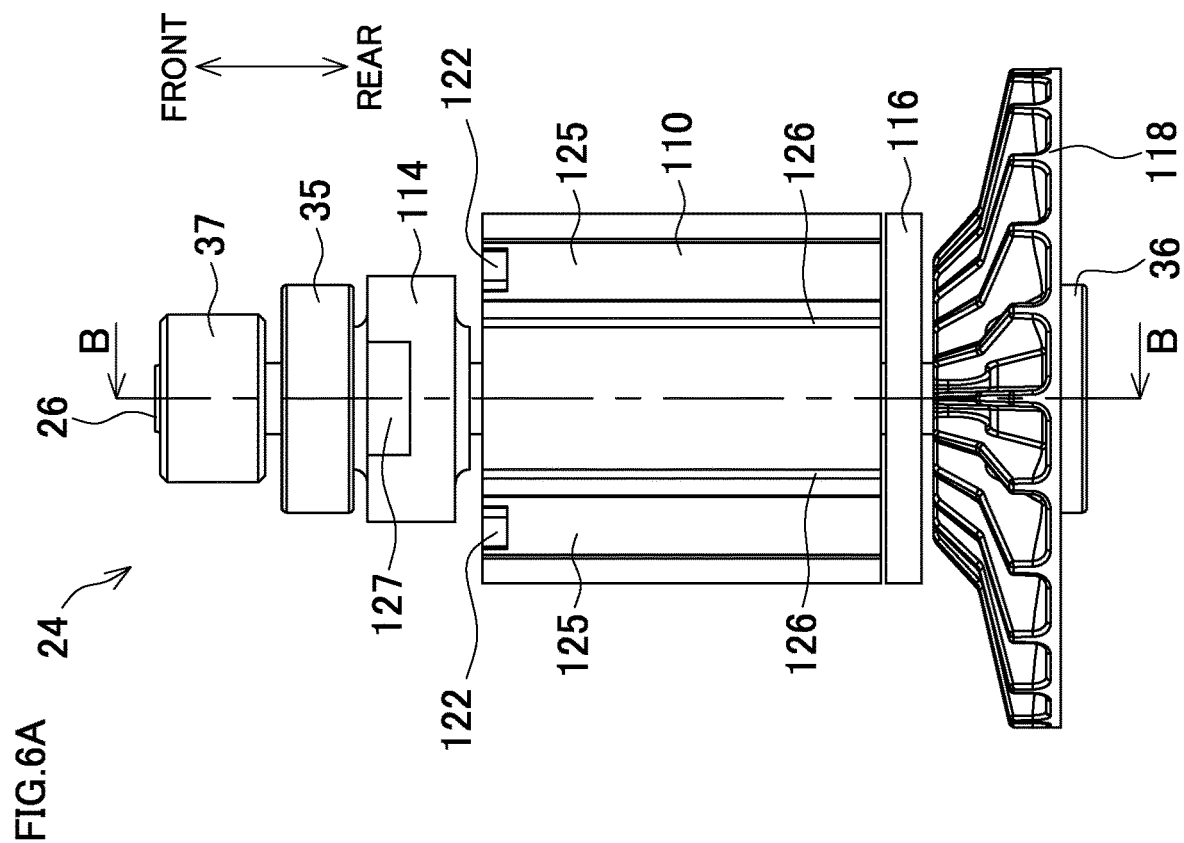
FIG. 6A is a side view when rotating by 45° from FIG. 5A.
Figure 6B:
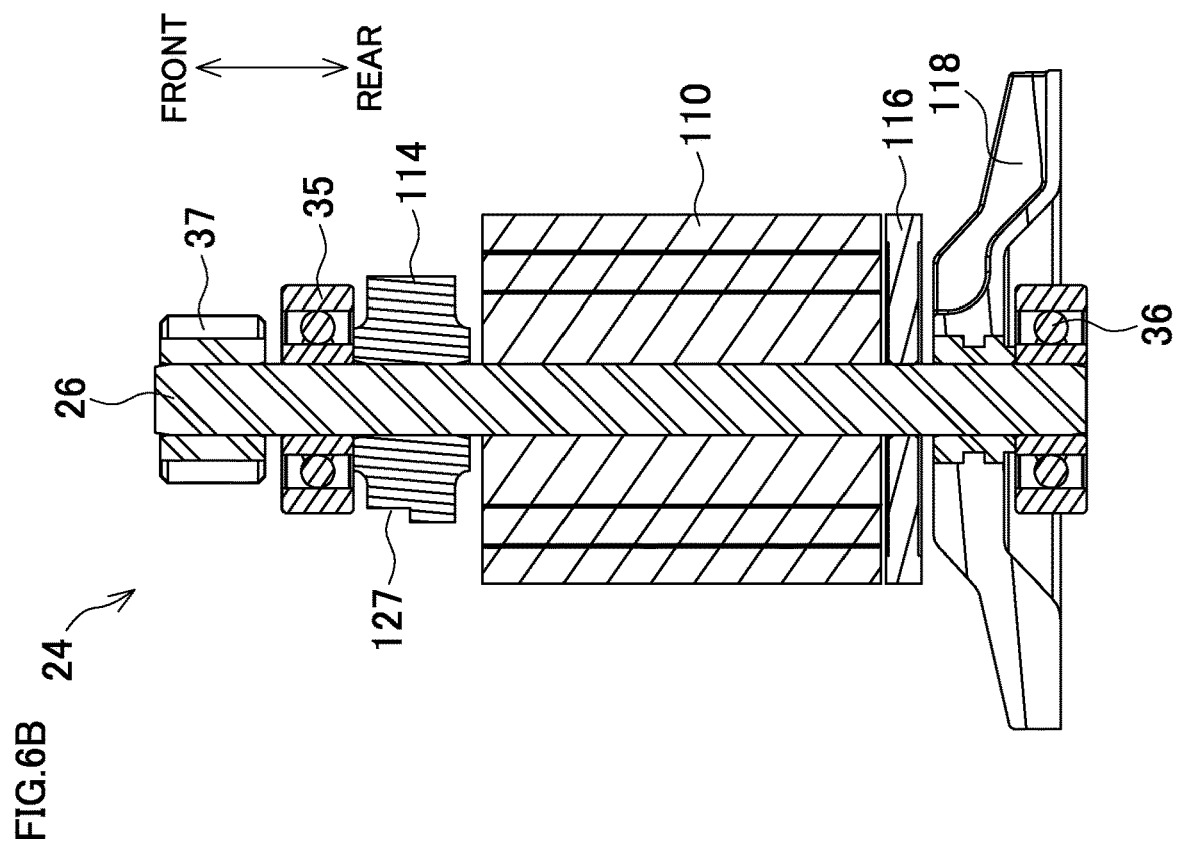
FIG. 6B is a cross-sectional view taken along a line B-B of FIG. 6A.
Figure 10:
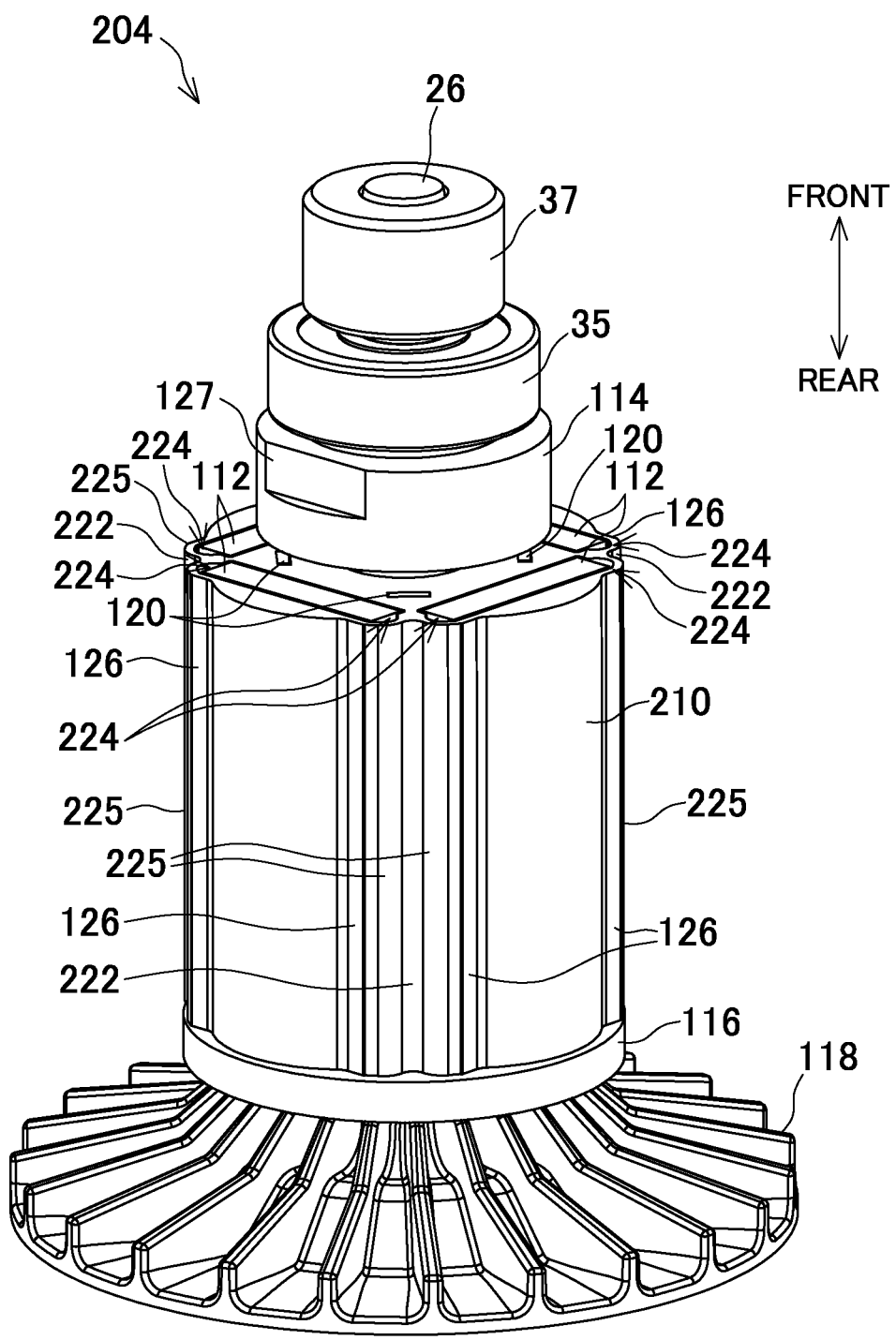
FIG. 10 is a perspective view of a rotor of a vibration driver drill according to a second embodiment of the invention.
Figure 12B:
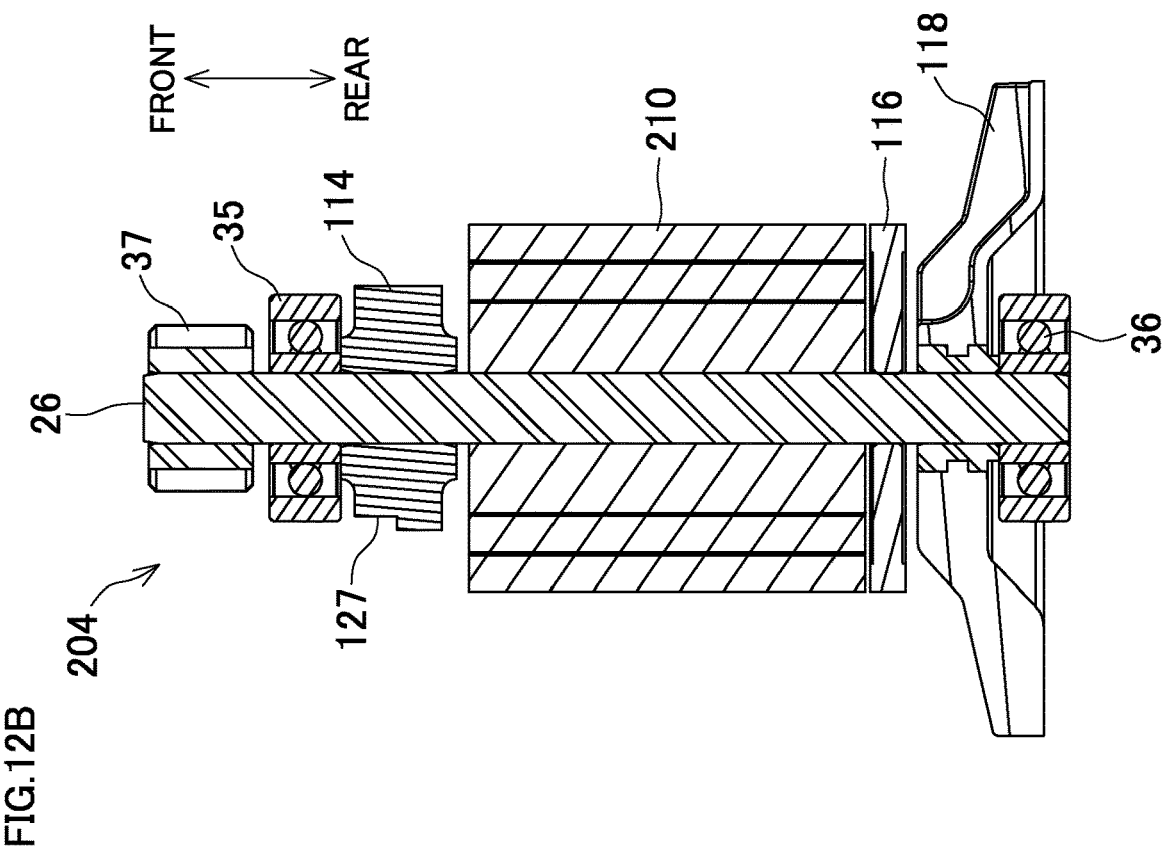
FIG. 12B is a cross-sectional view taken along a line D-D of FIG. 12A.
Figure 12A:
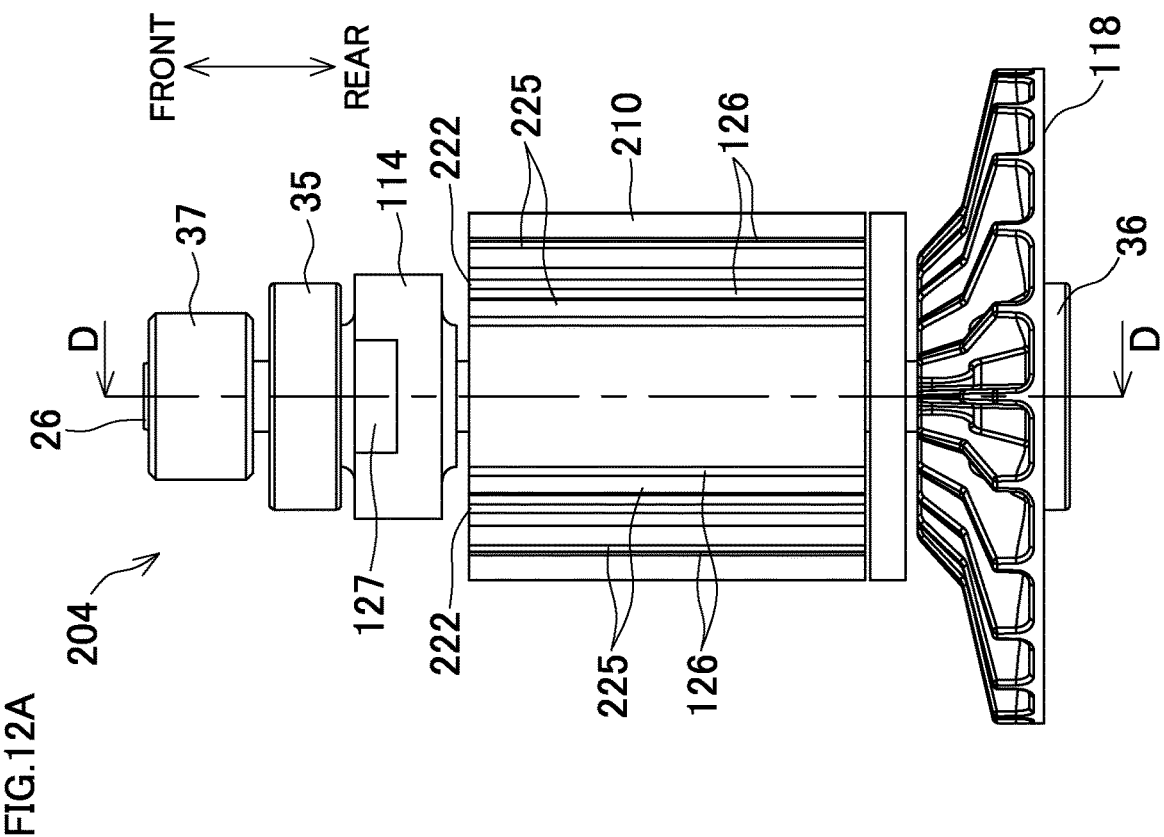
FIG. 12A is a side view when rotating by 45° from FIG. 11A.
Figure 13:
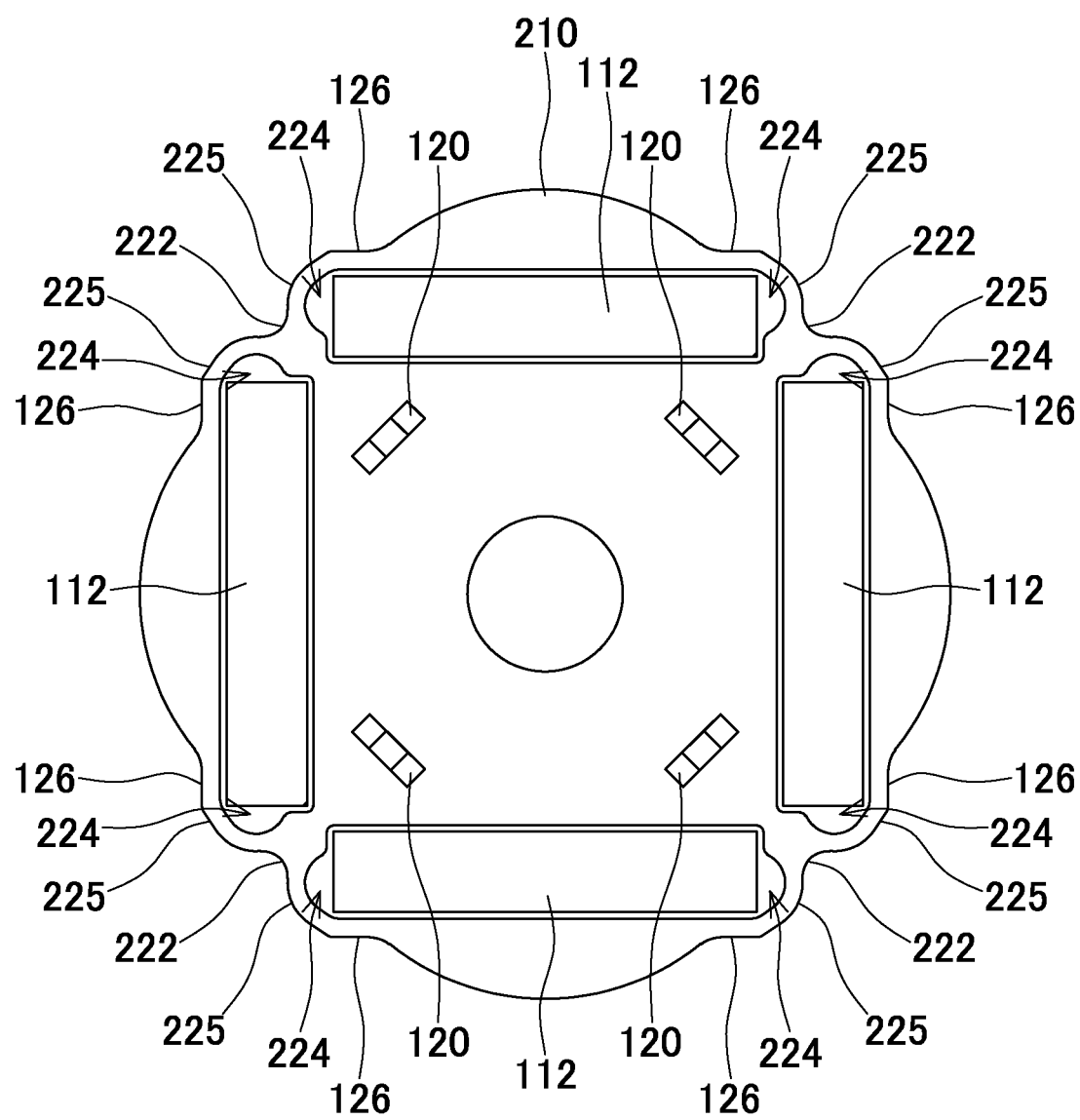
FIG. 13 is a front view of a rotor core according to the second embodiment.

FIG. 10 is a drawing similar to FIG. 4 and illustrates a vibration driver drill according to the second embodiment of the invention. FIGS. 11A and 11B are drawings similar to FIGS. 5A and 5B and illustrate the vibration driver drill. FIGS. 12 A and 12B are drawings similar to FIGS. 6 A and 6B and illustrate the vibration driver drill. FIG. 13 is a drawing similar to FIG. 7 and illustrates the vibration driver drill.

The vibration driver drill according to the second embodiment is formed similarly to the first embodiment except for the rotor. The same reference numerals are attached to the members and the portions similar to those in the first embodiment, and the explanation will be appropriately omitted.

A rotor core 210 of a rotor 204 in the vibration driver drill according to the second embodiment is formed by laminating eighty steel plates that are provided with flux barriers 224 and have the same shape. The rotor core 210 is not provided with the recessed groove 122 of the first embodiment over a part on the sensor circuit board 80 side in the front-rear direction.

The flux barriers 224 each have a lateral cross-section in a semicircular shape. The flux barriers 224 are each provided from the corner portion on the radially outside of the permanent magnet 112 to a position inside by approximately two thirds of the thickness of the permanent magnet 112. The flux barriers 224 are each disposed so as to have a curved surface in a semi-cylindrical shape facing the end portion of the permanent magnet 112.

The portion of the rotor core 210 outside each flux barrier 224 is a bulge portion 225 bulged in a semi-cylindrical shape. The outer surface of the bulge portion 225, that is, the side surface of the rotor core 210 at the bulge portion 225 has a semi-cylindrical shape. The bulge portion 225 is provided over the entire rotor core 210 in the front-rear direction. A groove 222 is provided between the bulge portions 225 mutually adjacent in the circumferential direction. Eight bulge portions 225 are provided and four grooves 222 are provided. The grooves 222 are each rounded in a semi-cylindrical shape. The configuration may be considered to be a configuration in which the grooves 222 that occupy the entire in the front-rear direction are provided in the centers in the circumferential direction of the four bulge portions that include pairs of flux barriers 224 and are similar to the bulge portion 125 of the first embodiment.

The outer surface of the bulge portion 225 includes a part parallel to a curved surface (surface facing the permanent magnet 112) of the flux barrier 224. The outer surface of the bulge portion 225 is parallel to an approximately half of the curved surface of the flux barrier 224 on the radially outside. The center of a curvature radius of the outer surface of the bulge portion 225 matches the center of a curvature radius of the curved surface of the flux barrier 224.

Figure 14:
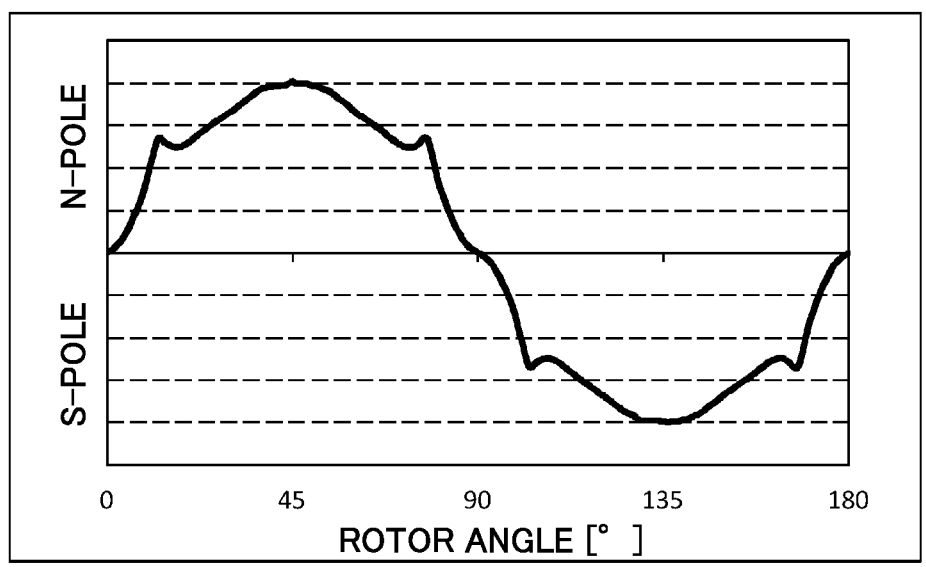
FIG. 14 is a graph indicating a magnetic-flux density detected by one rotation detecting element during a half rotation of the rotor according to the second embodiment.

FIG. 14 is a drawing similar to FIG. 8A according to the second embodiment. Also in the second embodiment, the polarity reversal R does not occur at the switching of the polarity.

The torque of the rotor 204 of the second embodiment is 99.8 when the torque of the rotor of the comparative example 1 is 100 similarly to the above description, thus being maintained to the extent same as the comparative example 1.

The vibration driver drill according to the second embodiment includes the brushless motor having the rotor 204 and the sensor circuit board 80 that detects the rotation of the rotor 204. The rotor 204 includes the tubular rotor core 210 and the four permanent magnets 112 held in the rotor core 210 so as to extend in the axial direction of the rotor core 210. The sensor circuit board 80 is adjacent to the front-end part (first end portion) of the rotor core 210. The rotor core 210 is provided with the flux barriers 224 and the grooves 222. The flux barrier 224 has a semicircular cross section and is disposed so as to have a curved surface facing the end portion at the end portion in the circumferential direction of the permanent magnet 112. The groove 222 extends from the front-end part in the axial direction of the rotor core 210 on the side surface outward between the pair of mutually adjacent permanent magnets 112. Accordingly, the detection accuracy of the rotation of the rotor core 210 by the sensor circuit board 80 is improved, thus accurately driving the brushless motor, sufficiently ensuring the torque of the rotor core 210, thereby providing the vibration driver drill in which the operation is accurate and the output is increased.

The side surface of the rotor core 210 radially outward the flux barrier 224 has the semi-cylindrical shape, and includes a part parallel to the surface of the flux barrier 224 facing the permanent magnet 112. Accordingly, the flux barrier 224 and the groove 222 having the semicircular cross sections for accurate driving and ensuring the sufficient torque are compactly disposed with a sufficient strength.

The second embodiment has modification examples similar to those of the first embodiment as necessary. The shape of the groove 222 does not need to be the cylindrical shape. Furthermore, the part in which the side surface of the rotor core 210 is parallel to the flux barrier 224 may be disposed to another part, and the side surface of the rotor core 210 may be parallel to the entire curved surface of the flux barrier 224.

A third embodiment of the invention is described below.

Figure 15:
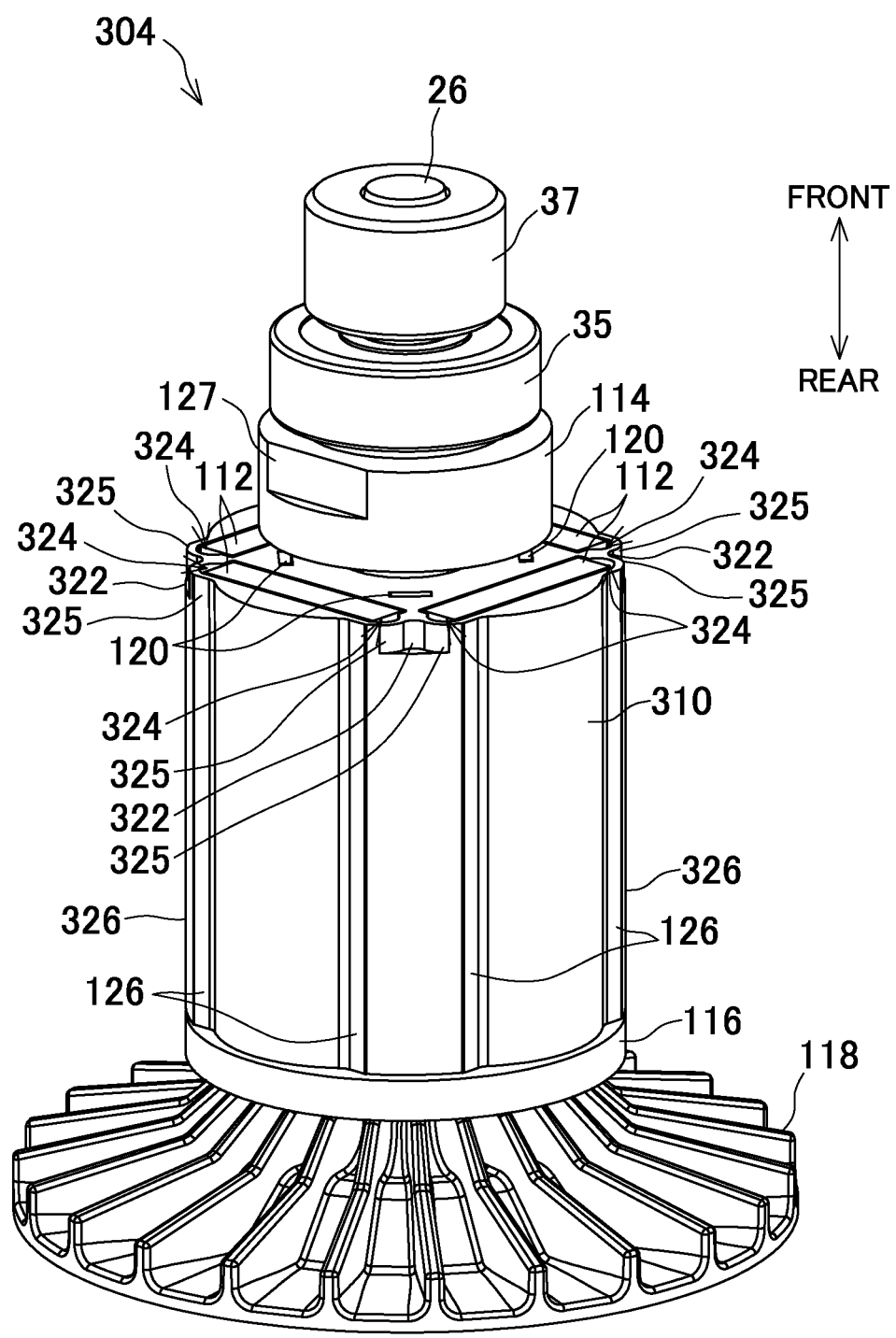
FIG. 15 is a perspective view of a rotor of a vibration driver drill according to a third embodiment of the invention.
Figure 16B:
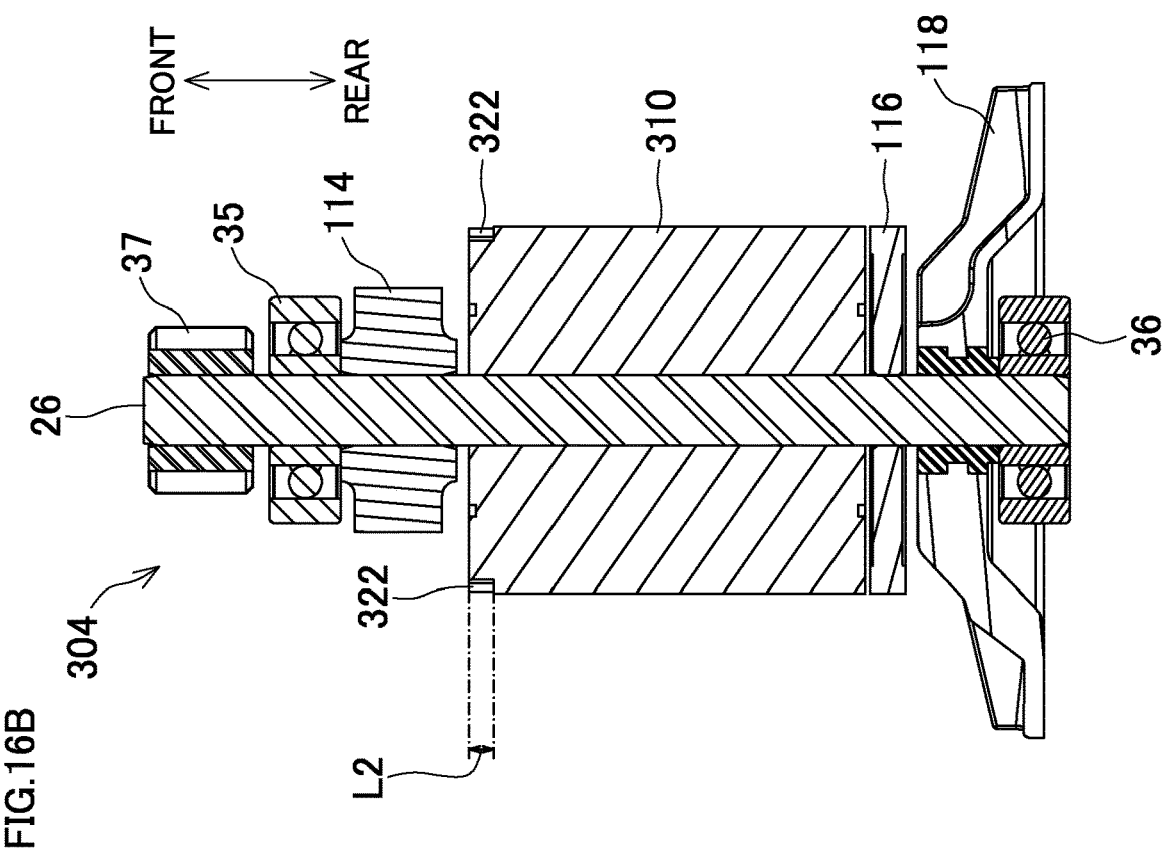
FIG. 16B is a cross-sectional view taken along a line E-E of FIG. 16A.
Figure 16A:
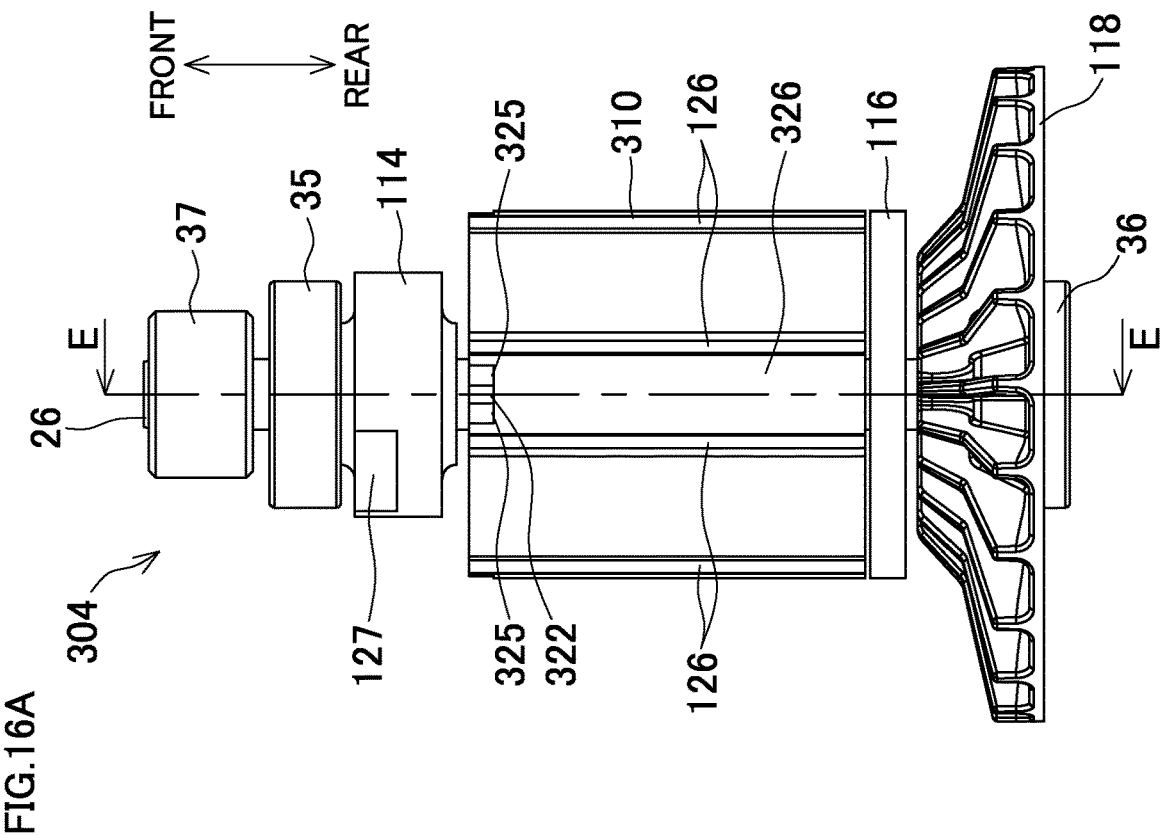
FIG. 16A is a side view of the rotor according to the third embodiment.
Figure 17B:
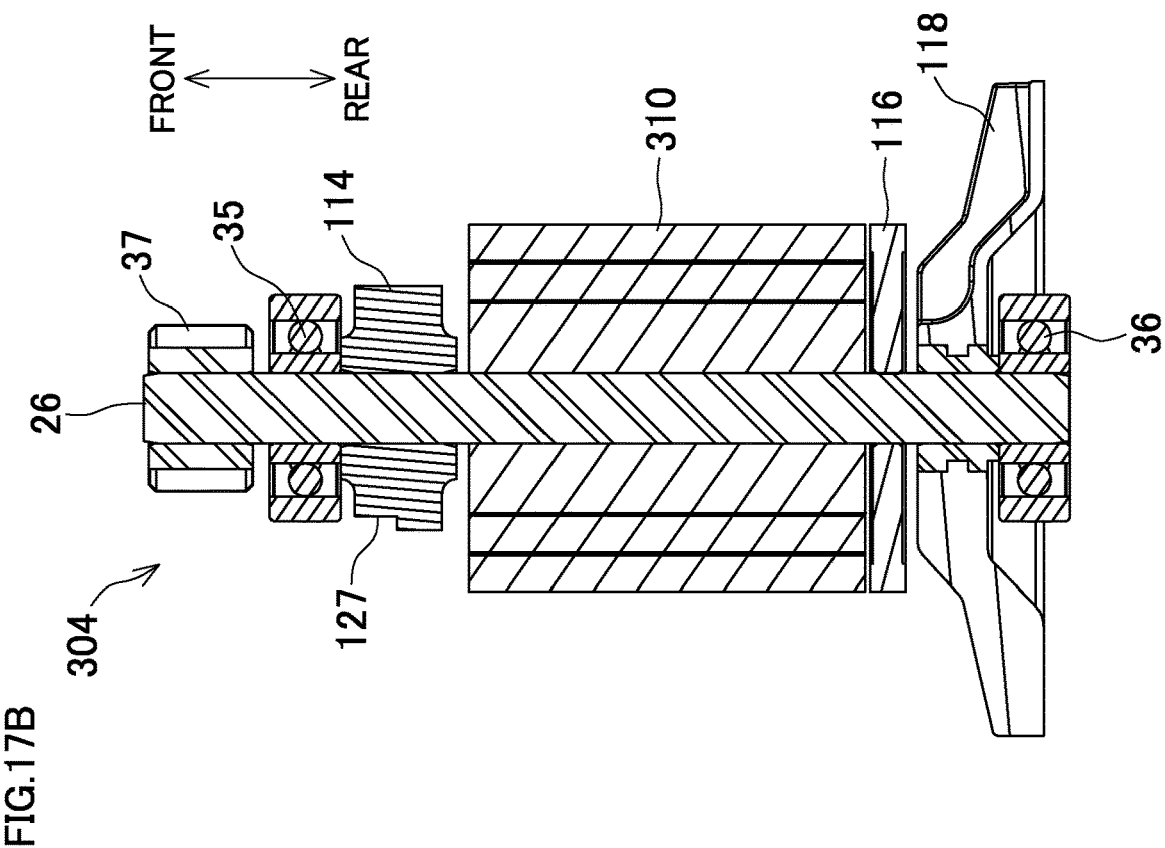
FIG. 17B is a cross-sectional view taken along a line F-F of FIG. 17A.
Figure 17A:
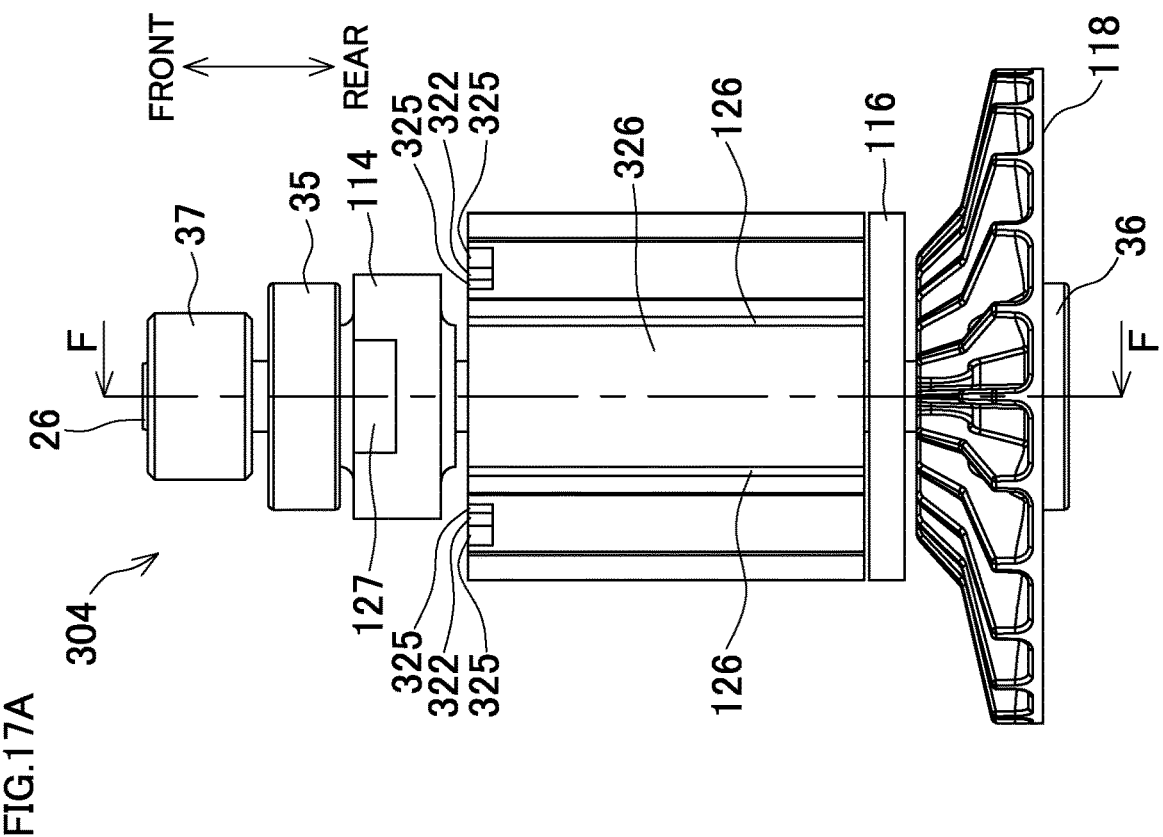
FIG. 17A is a side view when rotating by 45° from FIG. 16A.
Figure 18:
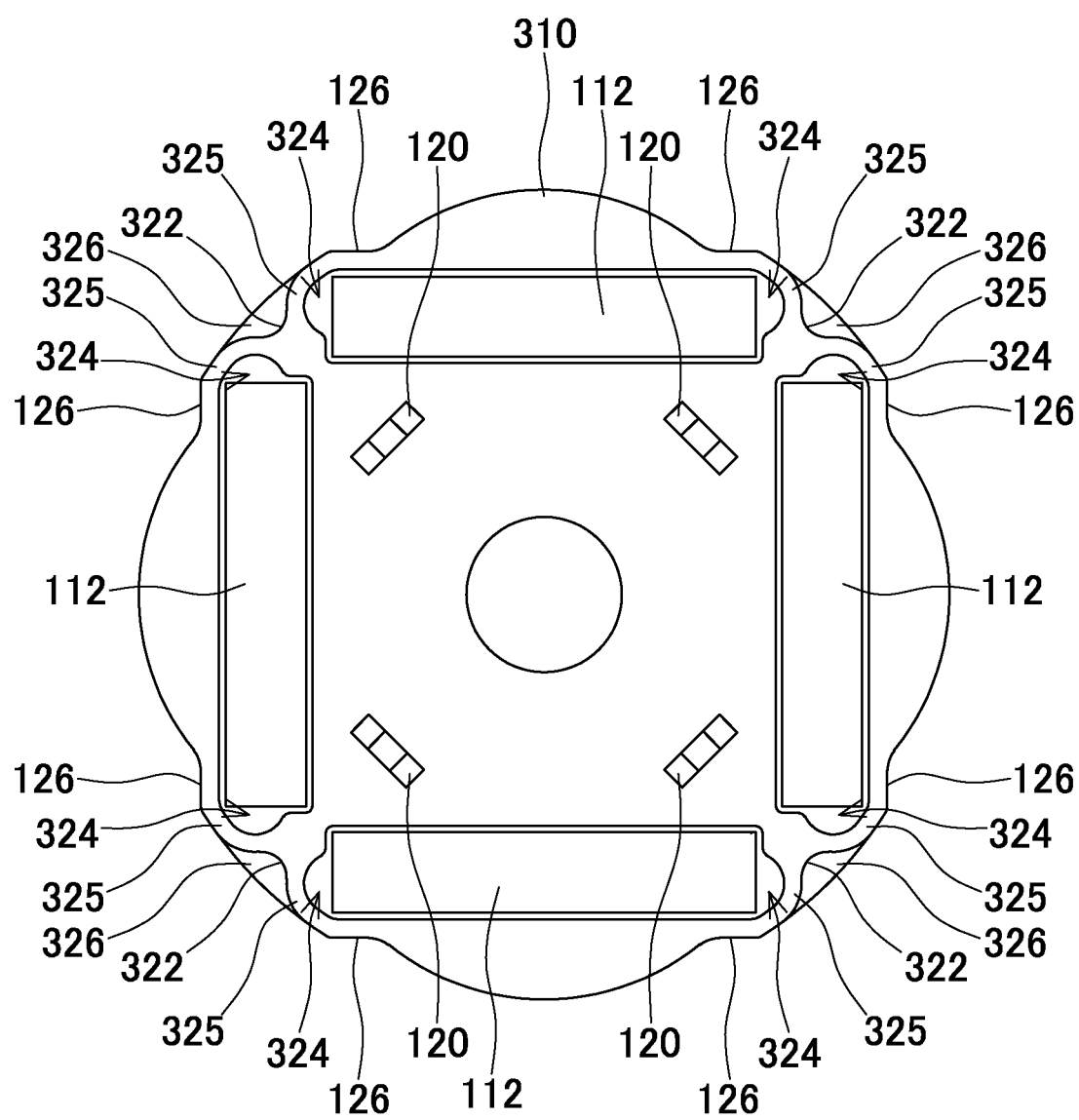
FIG. 18 is a front view of a rotor core according to the third embodiment.

FIG. 15 is a drawing similar to FIG. 4 and illustrates a vibration driver drill according to the third embodiment of the invention. FIGS. 16A and 16B are drawings similar to FIGS. 5A and 5B and illustrate the vibration driver drill. FIGS. 17 A and 17B are drawings similar to FIGS. 6A and 6B and illustrate the vibration driver drill. FIG. 18 is a drawing similar to FIG. 7 and illustrates the vibration driver drill.

The vibration driver drill according to the third embodiment is formed similarly to the second embodiment except for the rotor. The same reference numerals are attached to the members and the portions similar to those in the second embodiment, and the explanation will be appropriately omitted.

A rotor core 310 of a rotor 304 in the vibration driver drill according to the third embodiment is formed by laminating eighty steel plates.

The front six steel plates have the shapes same as that of the steel plate of the second embodiment.

The remaining seventy-four steel plates have the shapes same as those of the seventy-five steel plates of the first embodiment.

The rotor core 310 is provided with grooves 322 and pairs of bulge portions 325 by laminating the steel plates. The grooves 322 are similar to the respective grooves 222 of the second embodiment excluding the length in the front-rear direction. The pair of the bulge portions 325 are similar to the pair of the bulge portions 225 of the second embodiment excluding the length in the front-rear direction. The groove 322 and the pair of the bulge portions 325 extend to the front end of a bulge portion 326 and do not reach the rear-end part of the rotor core 310. Lengths L2 in the front-rear direction of the groove 322 and the pair of the bulge portions 325 are 1.2 mm.

The rotor core 310 is provided with a plurality of flux barriers 324 penetrating in the front-rear direction similar to the flux barrier 124 of the first embodiment. The flux barriers 324 each have a cross-sectional shape of the front portion similar to the cross-sectional shape of the flux barrier 224 of the second embodiment, and the flux barriers 324 each have a cross-sectional shape of the rear portion similar to the cross-sectional shape of the flux barrier 124 of the first embodiment.

Figure 19:
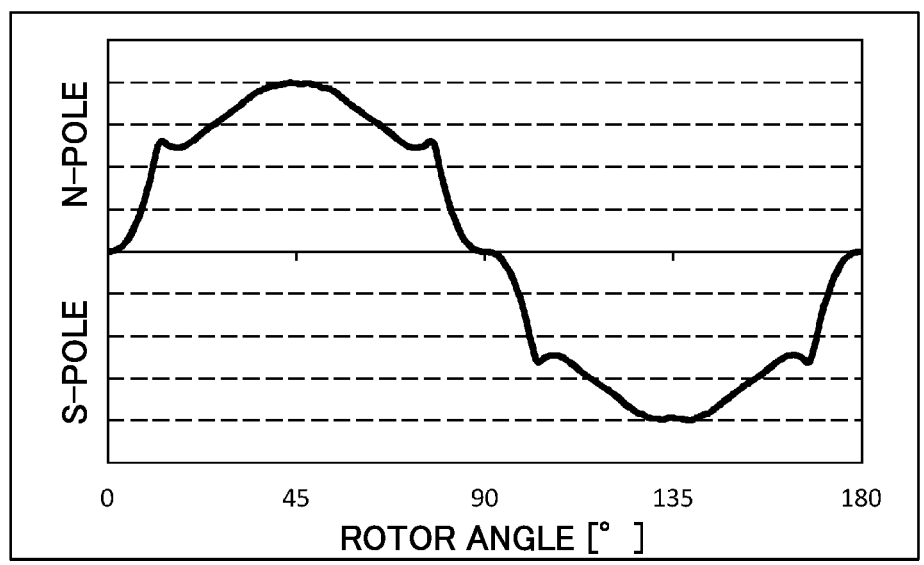
FIG. 19 is a graph indicating a magnetic-flux density detected by one rotation detecting element during a half rotation of the rotor according to the third embodiment.

FIG. 19 is a drawing similar to FIG. 8A according to the third embodiment. Also in the third embodiment, the polarity reversal R does not occur at the switching of the polarity.

The torque of the rotor 304 of the third embodiment is 99.9 when the torque of the rotor of the comparative example 1 is 100 similarly to the above description, thus being maintained to the extent same as the comparative example 1.

Figure 20A:
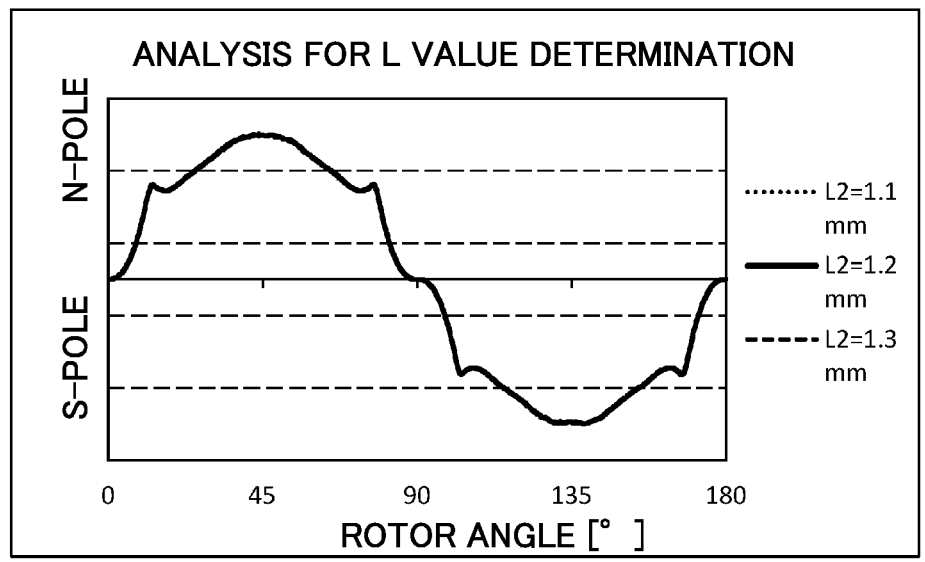
FIG. 20A is a graph indicating a magnetic-flux density detected by one rotation detecting element during a half rotation of the rotor according to three cases of a length L2 in the front-rear direction of a groove portion=1.1 mm, 1.2 mm, and 1.3 mm.
Figure 20B:
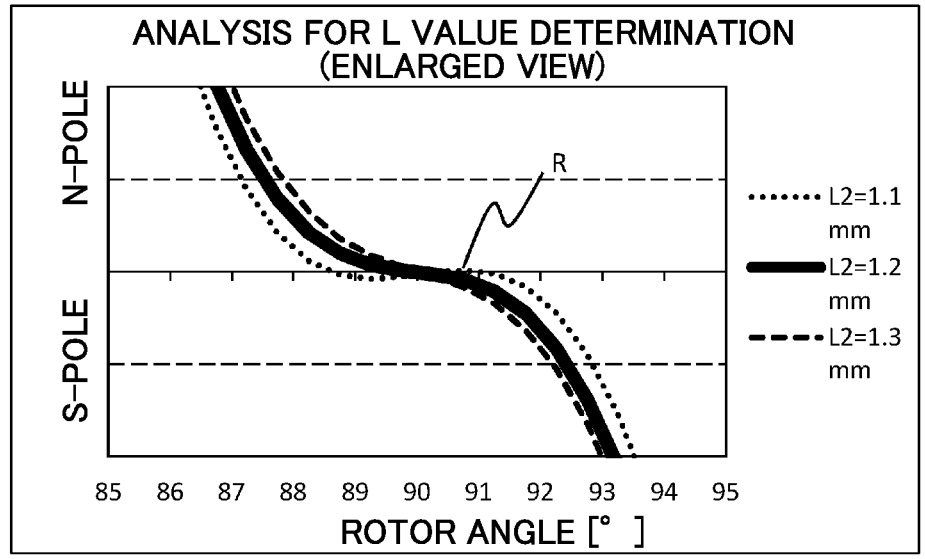
FIG. 20B is a partial enlarged view of FIG. 20A.

FIG. 20A is a graph similar to that of FIG. 8A according to three cases of the length L2 in the front-rear direction of the groove 322=1.1 mm, 1.2 mm, and 1.3 mm. FIG. 20B is a partial enlarged view of FIG. 20A.

In the case of L2=1.1 mm, the reversal R is slightly recognized at the switching of the polarity. In the cases of L2=1.2 mm and 1.3 mm, the reversal R is not recognized at the switching of the polarity.

Accordingly, with the length L2 in the front-rear direction of the groove 322=1.2 mm or more, the sufficiently accurate driving of the brushless motor 20 is ensured.

Meanwhile, as the length L2 in the front-rear direction of the groove 322 is decreased, the decrease in torque of the rotor 304 relative to the torque of the rotor without the installation of the groove 322 is more suppressed.

The vibration driver drill according to the third embodiment includes the brushless motor having the rotor 304 and the sensor circuit board 80 that detects the rotation of the rotor 304. The rotor 304 includes the tubular rotor core 310 and the four permanent magnets 112 held in the rotor core 310 so as to extend in the axial direction of the rotor core 310. The sensor circuit board 80 is adjacent to the front-end part (first end portion) of the rotor core 310. The rotor core 310 is provided with the flux barriers 324 and the grooves 322. The flux barrier 324 has a semicircular cross section and is disposed so as to have a curved surface facing the end portion at the end portion in the circumferential direction of the permanent magnet 112. The groove 322 extends from the front-end part in the axial direction of the rotor core 310 on the side surface outward between the pair of mutually adjacent permanent magnets 112 without reaching the rear-end part (second end portion) facing the front-end part. Accordingly, the detection accuracy of the rotation of the rotor core 310 by the sensor circuit board 80 is improved, thus accurately driving the brushless motor, sufficiently ensuring the torque of the rotor core 310, thereby providing the vibration driver drill in which the operation is accurate and the output is increased.

The length L2 of the groove 322 in the axial direction of the rotor core 310 is 1.2 millimeters or more. Accordingly, the detection accuracy of the rotation of the rotor core 310 becomes sufficiently excellent.

Furthermore, the vibration driver drill according to the third embodiment includes the motor shaft 26, the plurality of permanent magnets 112 extending in the axial direction of the motor shaft 26, the rotor core 310 penetrated by the motor shaft 26, and the rotation detecting element 83 that detects the rotations of the permanent magnets 112. The rotor core 310 has the shape different between the portion on the rotation detecting element 83 side (front portion) and the portion on the opposite side (rear portion). Accordingly, the detection accuracy of the rotation of the rotor core 310 by the sensor circuit board 80 is improved, thus accurately driving the brushless motor, sufficiently ensuring the torque of the rotor core 310, thereby providing the vibration driver drill in which the operation is accurate and the output is increased.

The vibration driver drill includes the motor shaft 26, the plurality of permanent magnets 112 extending in the axial direction of the motor shaft 26, the rotor core 310 penetrated by the motor shaft 26, and the rotation detecting element 83 that detects the rotations of the permanent magnets 112. The shape of the rotor core 310 is configured to avoid the occurrence of polarity reversal at the switching of the polarity. Accordingly, the detection accuracy of the rotation of the rotor core 310 by the sensor circuit board 80 is improved, thus accurately driving the brushless motor, sufficiently ensuring the torque of the rotor core 310, thereby providing the vibration driver drill in which the operation is accurate and the output is increased.

The third embodiment has modification examples similar to those of the second embodiment as necessary. The lengths of the groove 322 and the bulge portion 325 may be increased.

The invention claimed is:

1. An electric power tool comprising
a brushless motor that includes a rotor and a sensor circuit board, the sensor circuit board detecting a rotation of the rotor, wherein
the rotor includes a tubular or columnar rotor core and a plurality of permanent magnets, the plurality of permanent magnets being held in the rotor core so as to extend in an axial direction of the rotor core,
the sensor circuit board is adjacent to a first end portion of the rotor core, and
the rotor core is provided with a recessed groove on a side surface outward between all of each pair of mutually adjacent permanent magnets of the plurality of permanent magnets, the recessed groove extends from the first end portion in the axial direction of the rotor core without reaching a second end portion facing the first end portion,
wherein a flux barrier can be seen while looking toward a second end portion side of the rotor core from a first end portion side of the rotor core through the recessed groove.

2. The electric power tool according to claim 1, wherein a length of the recessed groove in the axial direction of the rotor core is 1.0 millimeters or more.

3. The electric power tool according to claim 1, wherein the rotor core is formed by axially laminating a plurality of steel plates, and
the recessed groove is formed by forming recessed portions recessed radially inward on a part of the steel plates on the first end portion side.

4. The electric power tool according to claim 1, wherein the sensor circuit board has a doughnut shape and includes a rotation detecting element that magnetically detects the rotation of the rotor.

* * * * *